(12) United States Patent
Yang et al.

(10) Patent No.: US 12,532,315 B2
(45) Date of Patent: Jan. 20, 2026

(54) MANAGING OVERLAP BETWEEN UPLINK CONTROL CHANNEL REPETITIONS AND UPLINK DATA TRANSMISSIONS

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 18/069,955

(22) Filed: Dec. 21, 2022

(65) Prior Publication Data
US 2023/0262695 A1 Aug. 17, 2023

Related U.S. Application Data

(60) Provisional application No. 63/309,455, filed on Feb. 11, 2022.

(51) Int. Cl.
*H04W 72/1268* (2023.01)
*H04W 72/21* (2023.01)
*H04W 72/566* (2023.01)

(52) U.S. Cl.
CPC ....... *H04W 72/1268* (2013.01); *H04W 72/21* (2023.01); *H04W 72/566* (2023.01)

(58) Field of Classification Search
CPC ............. H04W 72/1268; H04W 72/21; H04W 72/566; H04W 72/569
See application file for complete search history.

(56) References Cited

U.S. PATENT DOCUMENTS

2021/0314104 A1* 10/2021 Yin ................... H04L 1/1861
2022/0312427 A1   9/2022 Park et al.
(Continued)

FOREIGN PATENT DOCUMENTS

WO   WO-2019192021 A1   10/2019

OTHER PUBLICATIONS

ETSI, "5G; NR; Physical layer procedures for control (3GPP TS 38.213 version 16.8.0 Release 16)", ETSI, Jan. 2022, ETSI TS 138 213 V16.8.0) (Year: 2022).*

(Continued)

*Primary Examiner* — Michael K Phillips
(74) *Attorney, Agent, or Firm* — Holland & Hart LLP

(57) ABSTRACT

Methods, systems, and devices for wireless communications are described. A user equipment (UE) may perform a multi-stage overlap (e.g., conflict) resolution procedure based on a scheduling overlap between one or more repetitions of a first uplink control information (UCI) and one or more overlapping uplink transmissions having a different priority than the first UCI. The procedure may include a first stage based on a different starting slot index or UCI type between overlapping UCIs having a same priority, a second stage based on overlap resolution between the first UCI and an additional UCI, and a third stage based on overlap resolution between the first UCI and an uplink data transmission. The UE may selectively drop one or more of the overlapping UCIs or uplink transmissions and transmit at least a portion of the first UCI or the one or more overlapping uplink transmissions according to the procedure.

30 Claims, 14 Drawing Sheets

(56) References Cited

U.S. PATENT DOCUMENTS

| | | | |
|---|---|---|---|
| 2023/0042048 A1* | 2/2023 | Kim | H04B 7/063 |
| 2023/0050524 A1* | 2/2023 | Lai | H04W 72/12 |
| 2023/0137292 A1* | 5/2023 | Zhang | H04L 5/0035 |
| | | | 370/329 |
| 2023/0189278 A1* | 6/2023 | Ying | H04W 72/566 |
| | | | 370/329 |
| 2023/0224095 A1* | 7/2023 | Bae | H04L 1/1854 |
| | | | 370/329 |
| 2023/0291451 A1 | 9/2023 | Su et al. | |
| 2024/0039587 A1* | 2/2024 | Liu | H04B 7/0456 |
| 2024/0147471 A1* | 5/2024 | Islam | H04W 72/51 |
| 2024/0155667 A1* | 5/2024 | Jung | H04W 72/21 |
| 2024/0179689 A1* | 5/2024 | Xiong | H04L 5/0094 |
| 2024/0364479 A1* | 10/2024 | Wang | H04L 5/0055 |
| 2025/0016775 A1* | 1/2025 | Zhang | H04W 72/563 |
| 2025/0142574 A1* | 5/2025 | Gao | H04W 72/0446 |

OTHER PUBLICATIONS

Intel Corporation: "Further Analysis and Details of Intra-UE Multiplexing and Prioritization", 3GPP TSG RAN WG1 Meeting #104-bis-E, R1-2103030, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, XP052177838, pp. 1-21, the whole document.

Intel Corporation: "Further Details of Intra-UE Uplink Channel Multiplexing and Prioritization", 3GPP TSG RAN WG1 #106bis-e, R1-2109607, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, XP052058550, p. 6-p. 12, figures 1-5, pp. 1-22.

International Search Report and Written Opinion—PCT/US2022/082255—ISA/EPO—Mar. 30, 2023.

Moderator (OPPO) : "CR on Handling Overlapping PUCCH/PUSCH Transmissions with Repetitions and with Different Priorities", RP-202384, 3GPP TSG-RAN WG1 Meeting #103-e, R1-2009790, 3rd Generation Partnership Project, Mobile Competence Centre, 650, Route Des Lucioles, F-06921 Sophia-Antipolis Cedex, France, vol. RAN WG2, No. e-Meeting, Oct. 26, 2020-Nov. 13, 2020, Nov. 26, 2020, XP051960656, 3 Pages, the whole document.

* cited by examiner

US 12,532,315 B2

MANAGING OVERLAP BETWEEN UPLINK CONTROL CHANNEL REPETITIONS AND UPLINK DATA TRANSMISSIONS

CROSS REFERENCE

The present Application for Patent claims the benefit of U.S. Provisional Patent Application No. 63/309,455 by YANG et al., entitled "MANAGING OVERLAP BETWEEN UPLINK CONTROL CHANNEL REPETITIONS AND UPLINK DATA TRANSMISSIONS," filed Feb. 11, 2022, assigned to the assignee hereof, and expressly incorporated by reference herein.

FIELD OF TECHNOLOGY

The following relates to wireless communications, including managing overlapping between uplink control channel repetitions and uplink data transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a network entity may schedule multiple uplink channels for transmission by a UE over overlapping resources. Techniques for resolving scheduling overlaps between uplink transmissions may be improved.

SUMMARY

The described techniques relate to improved methods, systems, devices, and apparatuses that support managing overlapping between uplink control channel repetitions carrying uplink control information (UCI) and uplink data transmissions. For example, the described techniques provide for managing overlapping collisions between uplink control channel repetitions and uplink data transmissions. In some examples, multiple repetitions of a first UCI and one or more overlapping uplink transmissions may be scheduled with an overlap, where the first UCI and the one or more overlapping uplink transmissions may be associated with different priority indices. To resolve the overlapping channels, a user equipment (UE) may perform one or more stages of a multi-stage conflict resolution procedure, which may include prioritization procedures, intra-UE multiplexing procedures, or a combination thereof. The multi-stage conflict resolution procedure may alternatively be referred to as a multi-stage overlap resolution procedure because the procedure addresses conflicts arising from scheduling overlaps.

In a first stage of the multi-stage conflict resolution procedure, the UE may resolve any overlap between two or more overlapping UCI that share a same priority index, and the resolution may be based on a difference in a starting slot index or UCI type. In a second stage of the multi-stage conflict resolution procedure, the UE may resolve any overlap between any overlapping UCI having different priority indices. In a third stage of the multi-stage conflict resolution procedure, the UE may resolve any overlap between any UCI remaining after the first two stages and an uplink data transmission based on the respective priority indices of the UCI and the uplink data transmission. Based on the multi-stage conflict resolution procedure, the UE may selectively drop or transmit at least a portion of the first UCI or the one or more overlapping uplink transmissions.

A method is described. The method may include performing one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage may be based on overlap resolution between overlapping UCI of a same priority index, where the overlapping UCI includes one or more of: the first UCI, a second UCI associated with a priority index of the first UCI, or at least a portion of the one or more overlapping uplink transmissions. The second stage may be based on overlap resolution between the first UCI and a third UCI associated with a priority index different from the priority index of the first UCI, the first UCI and the third UCI associated with the one or more overlapping uplink transmissions. The third stage may be based on overlap resolution between the first UCI and an uplink data transmission associated with a priority index different from the priority index of the first UCI, the first UCI and the uplink data transmissions associated with the one or more overlapping uplink transmissions. The method may include transmitting at least a portion of the first UCI or the one or more overlapping uplink transmissions according to the one or more stages of the multi-stage overlap resolution procedure.

An apparatus is described. The apparatus may include at least one processor; and memory coupled with the at least one processor, the memory storing instructions for the at least one processor (e.g., directly, indirectly, after pre-processing, or without pre-processing) to cause a UE to perform one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage may be based on a difference between overlapping UCI of a same priority index, where the overlapping UCI includes one or more of: the first UCI, a second UCI associated with a priority index of the first UCI, or at least a portion of the one or more overlapping uplink transmissions. The second stage may be based on overlap resolution between the first UCI and a third UCI associated with a priority index different from the priority index of the first UCI, the first UCI and the third UCI associated with the one or more overlapping uplink transmissions. The third stage may be based on overlap resolution between the first UCI and an uplink data transmission associated with a priority index different from the priority index of the first UCI, the first UCI and the uplink data transmissions associated with the one or more overlapping uplink transmissions. The memory may store instructions for the at least one processor to cause the UE to transmit at least a portion of the first UCI or the one or more overlapping uplink transmissions according to the one or more stages of the multi-stage overlap resolution procedure.

Another apparatus is described. The apparatus may include means for performing one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage may be based on a difference between overlapping UCI of a same priority index, where the overlapping UCI includes one or more of: the first UCI, a second UCI associated with a priority index of the first UCI, or at least a portion of the one or more overlapping uplink transmissions. The second stage may be based on overlap resolution between the first UCI and a third UCI associated with a priority index different from the priority index of the first UCI, the first UCI and the third UCI associated with the one or more overlapping uplink transmissions. The third stage may be based on overlap resolution between the first UCI and an uplink data transmission associated with a priority index different from the priority index of the first UCI, the first UCI and the uplink data transmission associated with the one or more overlapping uplink transmissions. The apparatus may include means for transmitting at least a portion of the first UCI or the one or more overlapping uplink transmissions according to the one or more stages of the multi-stage overlap resolution procedure.

A non-transitory computer-readable medium storing code is described. The code may include instructions for at least one processor to perform one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage may be based on a difference between overlapping UCI of a same priority index, where the overlapping UCI includes one or more of: the first UCI, a second UCI associated with a priority index of the first UCI, or at least a portion of the one or more overlapping uplink transmissions. The second stage may be based on overlap resolution between the first UCI and a third UCI associated with a priority index different from the priority index of the first UCI, the first UCI and the third UCI associated with the one or more overlapping uplink transmissions. The third stage may be based on overlap resolution between the first UCI and an uplink data transmission associated with a priority index different from the priority index of the first UCI, the first UCI and the uplink data transmission associated with the one or more overlapping uplink transmissions. The code may include instructions for the at least one processor to transmit at least a portion of the first UCI or the one or more overlapping uplink transmissions according to the one or more stages of the multi-stage overlap resolution procedure.

In some examples of the method, apparatuses, and non-transitory computer-readable medium described herein, performing the one or more stages of the multi-stage overlap resolution procedure may include operations, features, means, or instructions for performing the first stage separately for each priority index of a set of multiple priority indices.

In some examples of the method, apparatuses, and non-transitory computer-readable medium described herein, performing the one or more stages of the multi-stage overlap resolution procedure may include operations, features, means, or instructions for selectively dropping during the second stage either a repetition of the one or more repetitions of the first UCI or the third UCI, where the dropping may be based on the priority index of the first UCI and the priority index of the third UCI.

In some examples of the method, apparatuses, and non-transitory computer-readable medium described herein, performing the one or more stages of the multi-stage overlap resolution procedure may include operations, features, means, or instructions for selectively dropping during the third stage either a repetition of the one or more repetitions of the first UCI or the uplink data transmission, where the dropping may be based on the priority index of the first UCI and the priority index of the uplink data transmission.

In some examples of the method, apparatuses, and non-transitory computer-readable medium described herein, transmitting at least the portion of the first UCI may include operations, features, means, or instructions for selectively dropping a repetition of the one or more repetitions of the first UCI and transmitting a remaining portion of the one or more repetitions of the first UCI.

Some examples of the method, apparatuses, and non-transitory computer-readable medium described herein may further include operations, features, means, or instructions for receiving an uplink grant for the uplink data transmission within a first processing time defined for the UE and receiving a downlink transmission triggering one or more of: the first UCI, the second UCI, or the third UCI within a second processing time defined for the UE.

In some examples of the method, apparatuses, and non-transitory computer-readable medium described herein, one or both of the second UCI or the third UCI may have no repetitions.

In some examples of the method, apparatuses, and non-transitory computer-readable medium described herein, performing the one or more stages of the multi-stage overlap resolution procedure may include operations, features, means, or instructions for dropping a set of multiple repetitions of the one or more repetitions of the first UCI during the second stage when the third UCI may be scheduled to overlap with the set of multiple repetitions of the one or more repetitions of the first UCI and the priority index of the first UCI indicates a lower priority than the priority index of the third UCI.

In some examples of the method, apparatuses, and non-transitory computer-readable medium described herein, performing the one or more stages of the multi-stage overlap resolution procedure may include operations, features, means, or instructions for dropping the third UCI during the second stage when the third UCI may be scheduled to overlap with a set of multiple repetitions of the one or more repetitions of the first UCI and the priority index of the first UCI indicates a higher priority than the priority index of the second UCI.

In some examples of the method, apparatuses, and non-transitory computer-readable medium described herein, performing the one or more stages of the multi-stage overlap resolution procedure may include operations, features, means, or instructions for dropping a set of multiple repetitions of the one or more repetitions of the first UCI during the third stage when the uplink data transmission may be scheduled to overlap with the set of multiple repetitions of the one or more repetitions of the first UCI and the priority index of the first UCI indicates a lower priority than the priority index of the uplink data transmission.

In some examples of the method, apparatuses, and non-transitory computer-readable medium described herein, performing the one or more stages of the multi-stage overlap resolution procedure may include operations, features, means, or instructions for dropping the uplink data transmission during the third stage when the uplink data transmission may be scheduled to overlap with a set of multiple repetitions of the one or more repetitions of the first UCI and the priority index of the first UCI indicates a higher priority than the priority index of the uplink data transmission.

In some examples of the method, apparatuses, and non-transitory computer-readable medium described herein, one or more of the first UCI, the second UCI, the third UCI, or the uplink data transmission may be scheduled using a first time unit that may be longer than second time unit, where another of the first UCI, the second UCI, or the uplink data transmission may be scheduled using the second time unit.

Some examples of the method, apparatuses, and non-transitory computer-readable medium described herein may further include operations, features, means, or instructions for assigning the one or more of the first UCI, the second UCI, the third UCI, or the uplink data transmission to a time period corresponding to the second time unit prior to performing the first stage of the multi-stage overlap resolution procedure.

Some examples of the method, apparatuses, and non-transitory computer-readable medium described herein may further include operations, features, means, or instructions for assigning the one or more of the first UCI, the second UCI, the third UCI, or the uplink data transmission to a time period corresponding to the second time unit between performing the first stage and performing the second stage of the multi-stage overlap resolution procedure.

In some examples of the method, apparatuses, and non-transitory computer-readable medium described herein, the first stage is based on a difference in starting slot index or UCI type between the overlapping UCI of the same priority index.

DETAILED DESCRIPTION

Figure 1:
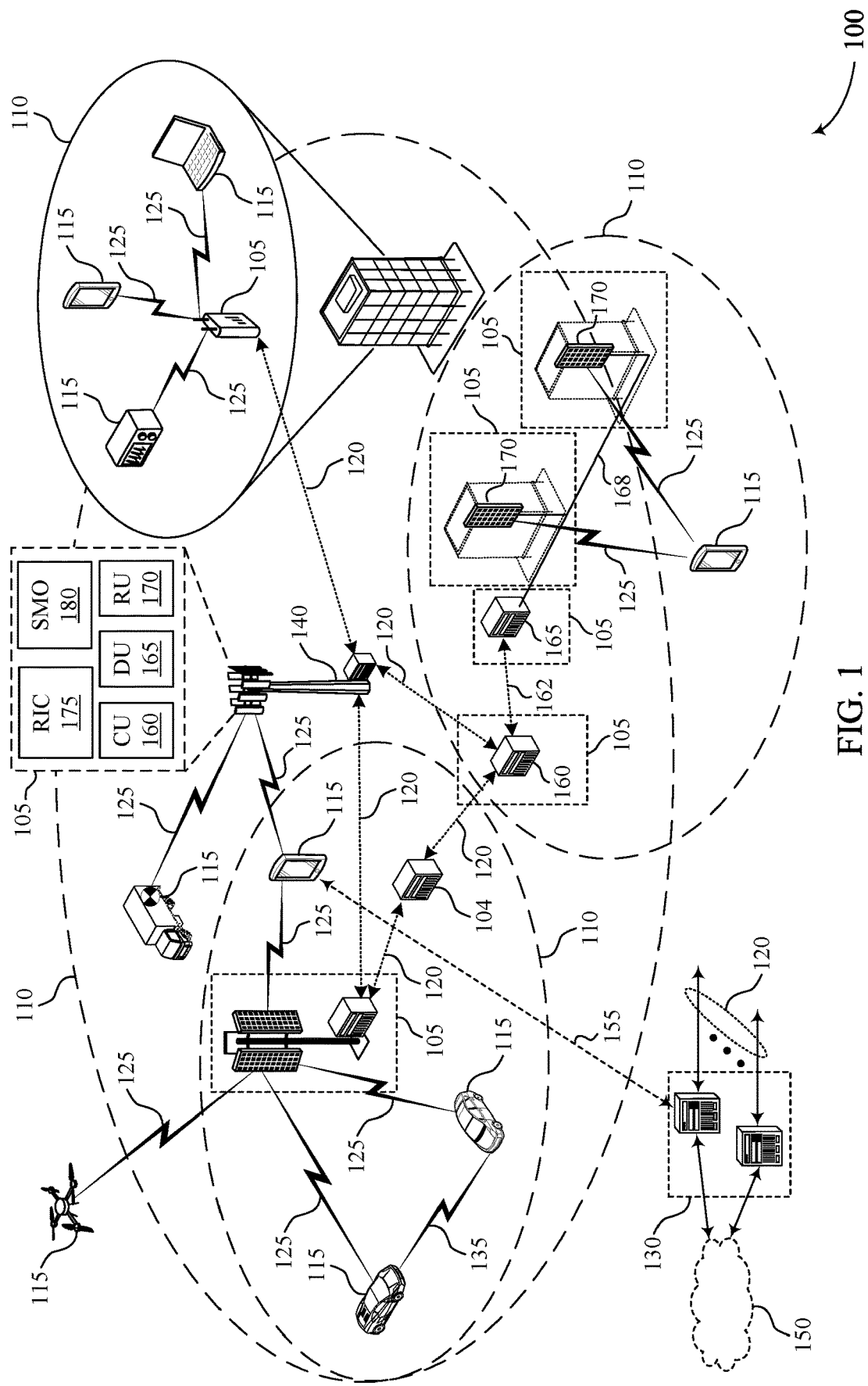
FIG. 1 illustrates an example of a wireless communications system that supports managing overlapping between uplink control channel repetitions and uplink data transmissions in accordance with one or more aspects of the present disclosure.

In some examples, a network entity may schedule multiple overlapping physical uplink control channel (PUCCH) transmissions carrying uplink control information (UCI) or physical uplink shared channel transmissions (PUSCHs) carrying uplink data for a user equipment (UE), where the scheduling overlap between the channels may cause a collision or scheduling conflict. If the UE lacks the ability to transmit the overlapping channels simultaneously, the UE may follow a prioritization procedure or an intra-UE multiplexing procedure to resolve the overlapping channels. For example, if two PUCCHs overlap, the UE may multiplex UCI of the PUCCHs into one PUCCH to resolve the overlapping channels. In another example, if overlapping channels are associated with different priority indices, the UE may at least partially cancel or drop relatively lower priority channels and transmit relatively higher priority channels to resolve the overlapping channels.

In addition, if two overlapping channels share a same priority index, the UE may resolve the overlapping channels based on a UCI-type priority associated with UCI carried in the channels. For example, the UE may at least partially cancel or drop channels carrying UCI with a relatively lower UCI-type priority (e.g., channel state information (CSI)) and transmit channels carrying UCI with a relatively higher UCI type priority (e.g., a hybrid automatic repeat request (HARQ) acknowledgment (ACK)). If the UCI in both channels is the same, the UE may at least partially cancel or drop the channel that is scheduled in a later slot and transmit a channel that is scheduled in an earlier slot. However, such prioritization rules may fail to resolve overlapping channels when at least one of the overlapping channels includes a PUCCH that is scheduled with repetitions.

Techniques described herein provide for managing overlapping collisions between PUCCH repetitions and uplink data transmissions. In some examples, multiple repetitions of a first UCI may conflict with one or more overlapping uplink transmissions, where the first UCI and the one or more overlapping uplink transmissions may be associated with different priority indices. This scenario may trigger one or more stages of a multi-stage conflict resolution procedure, which may include prioritization procedures, intra-UE multiplexing procedures, or a combination thereof. The multi-stage conflict resolution procedure may alternatively be referred to as a multi-stage overlap resolution procedure because the procedure addresses conflicts arising from scheduling overlaps. In a first stage of the multi-stage conflict resolution procedure, the UE may resolve an overlap between two or more overlapping UCI that share a same priority index, and the resolution may be based on a difference in a starting slot index or UCI type.

In a second stage of the multi-stage conflict resolution procedure, the UE may resolve any overlap between any overlapping UCI having different priority indices. In a third stage of the multi-stage conflict resolution procedure, the UE may resolve any overlap between any UCI remaining after the first two stages and an uplink transmission based on the respective priority indices of the UCI and the uplink data transmissions. Based on the multi-stage conflict resolution procedure, the UE may selectively drop or transmit at least a portion of the first UCI or the one or more overlapping uplink transmissions.

In some examples, a UCI prioritized from the one or more stages may be non-overlapping with other UCIs or uplink transmissions of the same priority index. That is, a resolved conflict between overlapping uplink transmissions may fail to overlap with different uplink transmissions. In addition, the multi-stage conflict resolution procedure may vary based on a time unit for which the UE is performing the one or more stages. For example, if the network entity schedules repetitions of the first UCI in subslots (e.g., instead of slots), the UE may selectively drop lower priority uplink transmissions that overlap with UCI including high priority HARQ-ACK in favor of transmitting the high priority HARQ-ACK. Additionally, or alternatively, the UE may associate a low priority UCI with a time unit (e.g., slot, subslot) corresponding to a high priority UCI at different times during the multi-stage conflict resolution procedure, which may impact the results of one or more stage of the multi-stage conflict resolution procedure.

Aspects of the disclosure are initially described in the context of wireless communications systems. Aspects of the disclosure are then described in the context of multi-stage conflict resolution procedures and process flows. Aspects of the disclosure are further illustrated by and described with reference to apparatus diagrams, system diagrams, and flowcharts that relate to managing overlapping between uplink control channel repetitions and uplink data transmissions.

FIG. 1 illustrates an example of a wireless communications system 100 that supports managing overlapping between uplink control channel repetitions and uplink data transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (RIC) 175 (e.g., a Near-Real Time RIC (Near-RT RIC), a Non-Real Time RIC (Non-RT RIC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 175 is flexible and may support different functionalities depending upon which functions (e.g., network layer functions, protocol layer functions, baseband functions, radio frequency functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support managing overlapping between uplink control channel repetitions and uplink data transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers—according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrow-band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some wireless communications systems 100 (e.g., NR communications systems), a network entity 105 may schedule a UE 115 with multiple overlapping channels for transmission. For example, the UE 115 may be scheduled with multiple PUCCHs or PUSCHs that overlap in time, which may cause a collision. If the UE 115 lacks the ability to simultaneously transmit the overlapping channels, the UE 115 may follow some intra-UE multiplexing procedures to resolve the overlapping channels and determine which channel to prioritize and transmit. In some examples, when overlapping PUCCHs are associated with a same priority index, the UE 115 may multiplex UCI of the PUCCHs into one PUCCH for transmission. In some other examples, if a PUCCH overlaps with a PUSCH, the UE may piggyback the UCI onto the PUSCH for transmission. However, if any of the PUCCHs include repetitions (e.g., if the PUCCH is scheduled over multiple slots with multiple occasions), the UE 115 may refrain from multiplexing the UCI on the PUCCH repetitions or multiplexing the repeated UCI on any PUSCHs. Instead, the UE 115 may follow some prioritization rules (e.g., dropping rules) in a multi-stage conflict resolution procedure to resolve the overlapping channels by dropping an overlapping channel that may be deprioritized (e.g., low priority compared to other channels) and transmitting channels that may be prioritized. Accordingly, if a PUCCH is scheduled as an independent transmission without repetitions, the UE 115 may use the intra-UE multiplexing procedures to resolve the overlapping channels, and if the PUCCH includes repetitions, the UE 115 may use the prioritization rules in the multi-stage conflict resolution procedure to resolve the overlapping channels.

In some cases, two or more priority levels may be used to establish a priority hierarchy between multiple overlapping channels. In one example, two priority levels may be defined and correspond to a priority index of 0, indicating a low priority, and a priority index of 1, indicating a high priority. If a collision occurs between two channel transmissions of different priority indices (e.g., if two overlapping PUCCHs have different priorities), the UE 115 may at least partially cancel a lower priority channel and transmit a higher priority channel during the overlapping time period based on the priority indices associated with each channel. In addition, the UE 115 may perform the intra-UE multiplexing procedures for channels with the same priority index. If two overlapping channels have the same priority index, the UE 115 may use the intra-UE multiplexing procedures or the prioritization rules of the multi-stage conflict resolution procedure based on the existence of PUCCH repetitions. As described herein, cancellation of a channel is different from dropping of a channel. That is, a channel cancellation may include partial cancellation (e.g., canceling a portion of the channel that is overlapping, while transmitting a remaining portion of the channel that is not overlapping), and dropping may apply to an entire transmission and has a more stringent time requirement.

Some wireless communications systems 100 may support a UE 115 multiplexing UCIs across different priorities within a same transmission, such that the UE 115 may avoid cancelling or dropping a low priority channel as much as possible. To support the intra-UE multiplexing for a case where none of the overlapping PUCCHs are scheduled with repetitions, the UE 115 may perform a multi-stage conflict resolution procedure to resolve any conflict between PUCCHs carrying UCI or PUSCHs carrying uplink data. In a first stage of the multi-state conflict resolution procedure, the UE 115 may first resolve any overlapping channels with a same priority index. That is, any overlapping PUCCHs remaining after the resolution may have different priorities.

After resolving the channels with the same priority index, the UE 115 may perform a second stage of the multi-stage conflict resolution procedure to resolve any overlap between channels with different priority indices (e.g., overlapping high priority channels and low priority channels). For example, the UE 115 may resolve any overlap between overlapping UCI having different priority indices (e.g., overlapping low priority PUCCHs and high priority PUCCHs). If the UE 115 may simultaneously transmit a PUSCH with a PUCCH (e.g., if the PUSCH and the PUCCH are scheduled on different bands, and are of different priorities), the PUSCH may be excluded from the set of overlapping channels for multiplexing the UCI with other PUSCHs.

In a third stage of the multi-stage conflict resolution procedure, the UE may resolve any overlap between any UCI remaining after the first two stages and an uplink data transmission. For example, if low priority PUCCHs, high priority PUCCHs, low priority PUSCHs, and high priority PUSCHs are included in different time units (e.g., slots, subslots, mix numerologies between PUCCHs and PUSCHs), the UE 115 may use a time unit of a high priority HARQ-ACK to resolve the overlapping channels.

However, some intra-UE multiplexing procedures may fail to resolve any overlap between one or more channels carrying UCI when at least one overlapping channels is scheduled with repetitions. For example, as long as there is a PUCCH with repetitions over multiple slots, the UE 115 may refrain from multiplexing different UCI types in order to resolve any overlap between the channels. In addition, if the UE 115 transmits a first PUCCH (e.g., a repetition) and a second PUCCH (e.g., a repetition or a single-slot transmission), then for each slot of the overlapping slots, the UE 115-a may follow a UCI-type priority rule in which the UE 115 may determine which PUCCH to transmit based on a priority of a UCI-type associated with each PUCCH. For example, a HARQ-ACK may have a higher priority than a scheduling request (SR), which may have a higher priority than CSI with a relatively higher priority, which may have a higher priority than a CSI with a relatively lower priority.

In addition to the priority levels (e.g., the priority index 0 and the priority index 1), the UE 115 may use additional prioritization rules in the multi-stage conflict resolution procedure which may be based on the UCI type. For example, if two overlapping PUCCHs have different UCI-type priorities, the UE 115 may transmit the corresponding UCI that has a higher-priority UCI type than the other PUCCHs. If the two overlapping PUCCHs have a same UCI-type-priority, the UE 115 may transmit a PUCCH that starts in an earlier slot (e.g., the UE 115 may prioritize a channel based on a starting time or slot of the channel) and drop a PUCCH that starts in a later slot. However, such prioritization rules may increase signaling overhead and decrease communication quality as many channels are canceled or dropped compared to those that are transmitted, particularly when a channel is scheduled with repetitions.

The wireless communications system 100 may support resolving overlapping channels between uplink control channel repetitions carrying UCI and uplink data transmissions. For example, a network entity 105 may schedule multiple repetitions of a first UCI that may conflict with one or more overlapping uplink transmissions, where the first UCI and the one or more uplink transmissions may be associated with different priority indices. The scenario may trigger one or more stages of a multi-stage conflict resolution procedure, which may include prioritization procedures, intra-UE multiplexing procedures, or a combination thereof. In a first stage of the multi-stage conflict resolution procedure, the UE 115 may resolve an overlap between one or more of the first UCI, a second UCI, or at least a portion of one or more overlapping uplink transmissions, where the first UCI and the second UCI may share a same priority index, and where the resolution may be based on a difference in a starting slot index or UCI type.

In a second stage of the multi-stage conflict resolution procedure, the UE 115 may resolve any overlap between any overlapping UCI having different priority indices. In a third stage of the multi-stage conflict resolution procedure, the UE 115 may resolve any overlap between any UCI remaining after the first two stages and an uplink data transmission based on the respective priority indices of the UCI and the uplink data transmission. Based on the multi-stage conflict resolution procedure, the UE 115 may selectively drop or transmit at least a portion of the first UCI or the one or more overlapping uplink transmissions.

Figure 2:
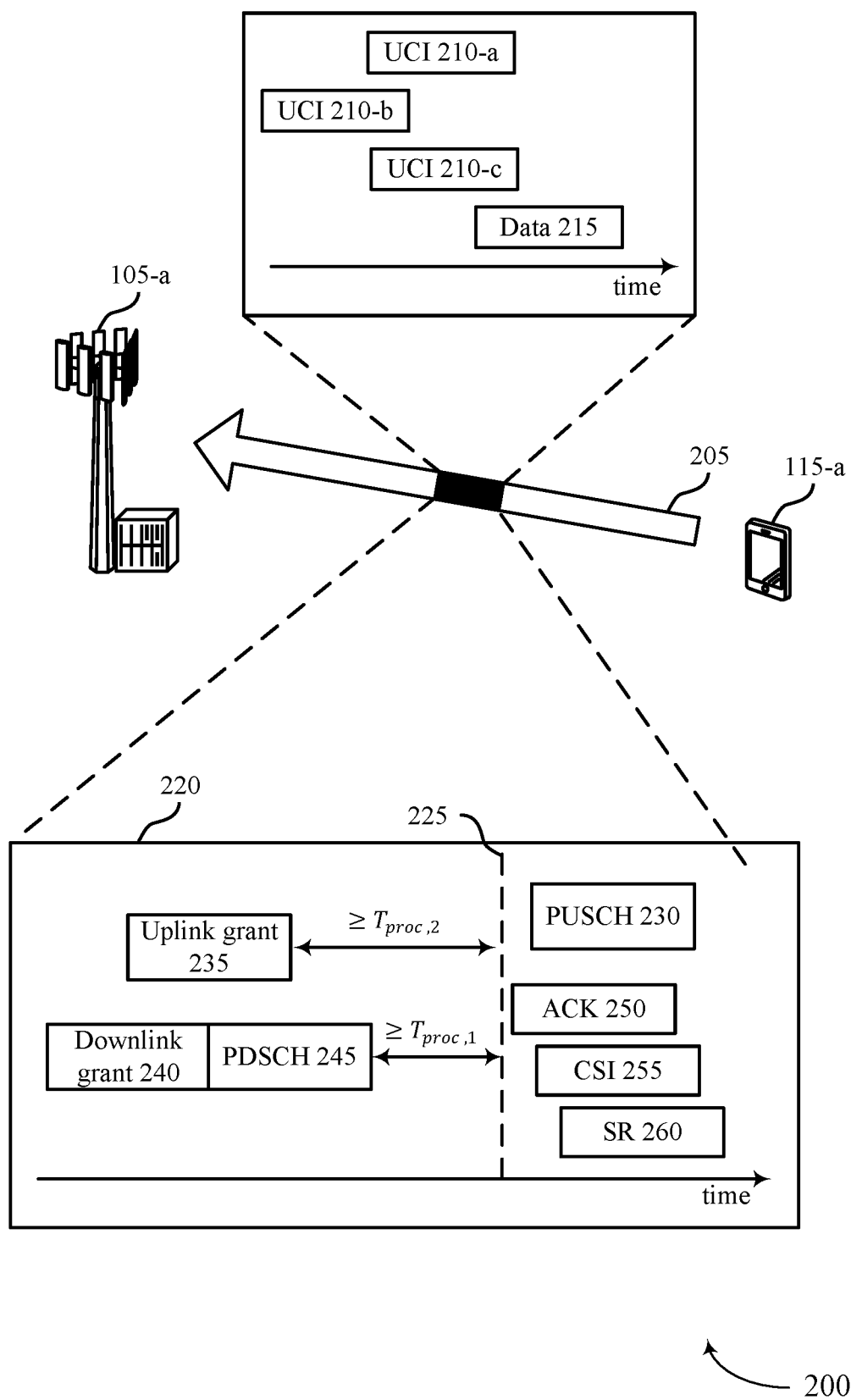
FIG. 2 illustrates an example of a wireless communications system that supports managing overlapping between uplink control channel repetitions and uplink data transmissions in accordance with one or more aspects of the present disclosure.

FIG. 2 illustrates an example of a wireless communications system 200 that supports managing overlapping between uplink control channel repetitions and uplink data transmissions in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. In some examples, the UE 115-*a* may perform a multi-stage conflict resolution procedure to resolve overlapping channel transmissions. As described herein, the multi-stage conflict resolution procedure may alternatively be referred to as a multi-stage overlap resolution procedure because the procedure addresses conflicts arising from scheduling overlaps.

The network entity 105-*a* and the UE 115-*a* may communicate via a wireless communications link 205 (e.g., an uplink). In some examples, the network entity 105-*a* may schedule uplink transmissions (e.g., PUCCH transmissions carrying UCI, PUSCH transmissions carrying uplink data) for the UE 115-*a* to perform via the wireless communications link 205. For example, the network entity 105-*a* may schedule two PUCCH transmissions that overlap in time such that the PUCCH transmissions collide. In addition, the overlapping PUCCHs may be scheduled with repetitions. To resolve overlapping channels (e.g., overlapping PUCCHs, overlapping PUCCHs and PUSCHs) in the case that at least one overlapping PUCCH is scheduled with repetitions, the UE 115-*a* may perform a multi-stage conflict resolution procedure, which may include a prioritization procedure (e.g., a repetition prioritization procedure) an intra-multiplexing procedure, or a combination thereof.

In some cases, the network entity 105-*a* may schedule multiple UCIs 210 (e.g., PUCCH transmissions) and uplink data transmissions for the UE 115-*a*. For example, the network entity 105-*a* may schedule a UCI 210-*a* (e.g., a first UCI), a UCI 210-*b* (e.g., a second UCI), a UCI 210-*c* (e.g., a third UCI), and uplink data 215, where the UCI 210-*a* may be scheduled with one or more repetitions. In some cases, the one or more repetitions of the UCI 210-*a* may overlap with the UCI 210-*b*, the UCI 210-*c*, the uplink data 215, or any combination thereof.

In some examples, the UCI 210-*a* may overlap with the UCI 210-*b*, where the UCI 210-*a* and the UCI 210-*b* share a same priority index. In some cases, the UE 115-*a* may resolve overlapping or PUCCH transmissions, PUSCH transmissions, or both of a same priority index. For example, the UCI 210-*a* and the UCI 210-*b* may share a priority index 0 (e.g., indicating a low priority) or a priority index 1 (e.g., indicating a high priority). In some cases, the UE 115-*a* may perform a first stage of the multi-stage conflict resolution procedure, independently for each priority index. Because the UCI 210-*a* is scheduled with repetitions and has a given priority (e.g., priority X), the UE 115-*a* may perform the first stage to determine whether to prioritize the UCI 210-*a* or the UCI 210-*b*, where the first stage may include a prioritization procedure based on a starting slot index and a priority of a UCI type. In some examples, the starting slot index may correspond to a time (e.g., slot) at which each UCI 210 is scheduled to be transmitted. For example, the UCI 210-*b* may have an earlier starting slot than the UCI 210-*a*. The priority of the UCI type may indicate that a HARQ-ACK has a higher priority than an SR, which may have a higher priority than a high priority CSI, which may have a higher priority than a low priority CSI (e.g., HARQ-ACK>SR>high priority CSI>low priority CSI). That is, a UCI 210 carrying a HARQ-ACK may be prioritized over a UCI 210 carrying an SR, and so on.

If two different overlapping UCIs 210 share a same priority index different from the priority index shared by the UCI 210-*a* and the UCI 210-*b* (e.g., priority Y), and neither of the overlapping UCIs 210 with a priority Y are scheduled with repetitions, the UE 115-*a* may perform an intra-UE multiplexing procedure to resolve the overlap regardless of the UCI 210-*a* being scheduled with repetitions. As such, the UE 115-*a* may apply different prioritization rules (e.g., whether for the intra-UE multiplexing procedure or the prioritization procedure) for UCI 210 with different priorities. In addition, after the UE 115-*a* resolves the overlapping for UCIs 210 with the same priority index (e.g., priority X or priority Y), then any scheduled UCIs 210 with the same priority index may no longer be overlapping.

In some cases, the UCI 210-*a* may have a different priority index from the UCI 210-*c* and the uplink data 215. As such, the UE 115-*a* continue the multi-stage conflict resolution procedure to resolve the scheduling overlaps of UCIs 210 with different priorities. For example, the UE 115-*a* may perform a second stage of the multi-stage conflict resolution procedure to resolve the overlap between the UCI 210-*a* and the UCI 210-*c*, where the UCI 210-*a* and the UCI 210-*c* may be associated with different priority indices. That is, the priority index of the UCI 210-*a* may be different from a priority index of the UCI 210-*c*. As the UCI 210-*a* is scheduled with repetitions, the UE 115-*a* may resolve the overlap between the UCI 210-*a* and the UCI 210-*c* by dropping the UCI 210 with a lower priority index. For example, if the UCI 210-*a* has a higher priority than the UCI 210-*c*, the UE 115-*a* may selectively drop the UCI 210-*c* in favor of the UCI 210-*a*. Otherwise (e.g., if the UCI 210-*a* has a lower priority index than the UCI 210-*c*), the UE 115-*a* may drop the UCI 210-*a* in favor of the UCI 210-*a*. Dropping (e.g., selectively dropping) a UCI 210 or some other data may include canceling a transmission of the UCI 210, refraining from transmitting the UCI 210, or removing the UCI 210 from memory, a buffer, or a storage of the UE 115-*a*, among other forms of dropping a transmission.

The UE 115-*a* may perform the second stage of the multi-stage conflict resolution procedure for each time unit (e.g., slot, subslot) associated with a high priority HARQ-ACK. For example, if the high priority HARQ-ACK is subslot-based, the UE 115-*a* may perform the second stage of the multi-stage conflict resolution procedure for each subslot in which any overlap occurs. If the high priority HARQ-ACK is slot-based, the UE 115-*a* may perform the second stage of the multi-stage conflict resolution procedure for each slot in which any overlap occurs.

In some examples, the UCI 210-*a* and the uplink data 215 may be associated with different priority indices. As such, the UE 115-*a* may continue the multi-stage conflict resolution procedure to resolve any scheduling overlap between the UCI 210-*a* and the uplink data 215. For example, the UE 115-*a* may perform a third stage of the multi-stage conflict resolution procedure to resolve the overlap between the UCI 210-*a* and the uplink data 215, where the UCI 210-*a* and the uplink data 215 may be associated with different priority indices. That is, the priority index of the UCI 210-*a* may be different from a priority index of the uplink data 215. If the remaining PUCCH still has repetitions (e.g., the UCI 210-*a*), the UE 115-*a* may drop the UCI 210-*a* or the uplink data 215 with the lower priority index. That is, the UE 115-*a* may perform a third stage of the multi-stage conflict resolution procedure based on the difference in priority index between the UCI 210-*a* and the uplink data 215. For example, if the UCI 210-*a* has a higher priority than the uplink data 215, the UE 115-*a* may selectively drop the uplink data 215 in favor of the UCI 210-*a*. Otherwise (e.g., if the uplink data 215 has a higher priority than the UCI 210-*a*)), the UE 115-*a* may drop the UCI 210-*a* in favor of the uplink data 215. In some examples, the UE 115-*a* may resolve overlapping for PUCCH transmissions of different priority indexes during the second stage.

The UE 115-a may perform the third stage of the multi-stage conflict resolution procedure for each time unit (e.g., slot, subslot) associated with a high priority HARQ-ACK. For example, if the high priority HARQ-ACK is subslot-based, the UE 115-a may perform the third stage of the multi-stage conflict resolution procedure for each subslot in which any overlap occurs. If the high priority HARQ-ACK is slot-based, the UE 115-a may perform the third stage of the multi-stage conflict resolution procedure for each slot in which any overlap occurs. In some cases, the UE 115-a may resolve the overlapping for PUCCH and PUSCH transmissions of different priority indices during the third stage.

The UE 115-a may transmit at least a portion of the UCI 210-a, the UCI 210-b, the UCI 210-c, or the uplink data 215 to the network entity 105-a according to the one or more stages of the multi-stage conflict resolution procedure (e.g., the prioritization procedures and the intra-UE multiplexing). For example, the UE 115-a may multiplex downlink HARQ-ACK information with or without scheduling requests, and one or more CSI reports in a same PUCCH. In some other examples, the UE 115-a may drop the one or more CSI reports and include only the downlink HARQ-ACK information, with or without a scheduling request, in the PUCCH.

In some examples, if the UCI 210-a has a higher priority than the UCI 210-c or the uplink data 215, the UE 115-a may transmit the UCI 210-a to the network entity 105-a. In some other examples, if the UCI 210-a and the UCI 210-b have a same priority index, the UE 115-a may multiplex the UCIs 210 into one PUCCH and transmit the PUCCH to the network entity 105-a. In some examples, a portion of the UCI 210-a may overlap with a portion of the UCI 210-b, the UCI 210-c, or the uplink data 215. For example, if a portion of each of the UCI 210-a and the uplink data 215 overlaps, and the UCI 210-a has a higher priority index than the uplink data 215, the UE 115-b may partially cancel the uplink data 215 such that the portion with the overlap is canceled, and the rest of the uplink data 215 may be transmitted in addition to the higher-priority UCI 210-a. In addition, at each stage of the multi-stage conflict resolution procedure, if the UE 115-a is to drop a PUCCH with repetitions due to the PUCCH having a relatively lower UCI-type priority in the first stage or being associated with a relatively lower priority index in the second stage and the third stage, then the UE 115-a may drop any one or more overlapping PUCCH repetitions and still transmit any non-overlapping PUCCH repetitions.

Each stage of the multi-stage conflict resolution procedure may result in a resultant channel (e.g., a resultant PUCCH) that may differ from the overlapping channels. For example, if the UE 115-a drops a repetition of the UCI 210-a based on a priority index of the UCI 210-b being higher than a priority index of the UCI 210-a, the UE 115-a may transmit the UCI 210-b on a resultant channel. In another example, if the UCI 210-a and the UCI 210-b have a same priority index, and if the UE 115-a performs intra-UE multiplexing to multiplex the UCI 210-a and the UCI 210-b into one PUCCH, the PUCCH may be a new resultant channel. In some cases, the resultant channel may overlap with other channels having the same priority index (e.g., as the UCI 210-a, the UCI 210-b, and the resultant channel). The UE 115-a may then resolve this new overlap in another stage of the multi-stage conflict resolution procedure based on the priorities of the corresponding overlapping channels.

In some examples, however, the resultant channel of a stage of the multi-stage conflict resolution procedure may be non-overlapping with a UCI 210 with repetitions with the same priority as the resultant channel. That is, the UE 115-a may not expect a resultant channel of a stage of the multi-stage conflict resolution procedure to be overlapping with another PUCCH resource with repetitions. If the resultant channel is a result from the first stage of the multi-stage conflict resolution procedure, then the UE 115-a may not expect the resultant channel to overlap with another PUCCH with repetitions with the same priority. If the resultant channel is a result from the second stage of the multi-stage conflict resolution procedure, then the UE 115-a may not expecting the resultant channel to be overlapping with any other PUCCH with repetitions regardless of whether the priority of the other PUCCH with repetitions is the same or different from the resultant channel. For example, in some cases, the UCI 210-b and the UCI 210-c may both lack repetitions such that the UCI 210-b and the UCI 210-c may lack conflict with other UCIs 210 after a corresponding overlap with the UCI 210-a is resolved.

In performing the multi-stage conflict resolution procedure described herein, the UE 115-a may follow a timeline 220 such that the UE 115-a has time to determine which overlapping UCIs 210 or uplink data 215 to prioritize. For example, if the network entity 105-a schedules two overlapping UCIs 210, which may trigger the UE 115-a to perform the intra-UE multiplexing procedure or the prioritization procedure, the network entity 105-a may use the timeline 220 to provide the UE 115-a sufficient time to perform the procedures. In some examples, for the intra-UE multiplexing procedure, a reference time 225 may defined which may indicate a time of an earliest overlap between UCIs 210. Then, any uplink grant 235 (e.g., which schedules the transmission of the uplink data 215) may arrive before the reference time 225 by a time of at least $T_{proc,2}$. In addition, any downlink grant 240 and corresponding physical downlink shared channel (PDSCH) 245 may arrive before the reference time 225 by a time of at least $T_{proc,1}$. As such, as long as the uplink grant 235 and the downlink grant 240 arrive prior to the reference time 225 (e.g., within a particular processing time), the UE 115-a may maintain the ability to multiplex the overlapping UCIs 210. In some examples, any transmission of a PUSCH 230 (e.g., which may carry the uplink data 215), an ACK 250, a CSI 255, an SR 260, or any combination thereof (e.g., which may be carried in a UCI 210) may be performed by the UE 115-a after the reference time 225 and according to the multi-stage conflict resolution procedure. In addition, the timeline 220 may apply to intra-UE multiplexing procedures across different priorities.

Figure 3:
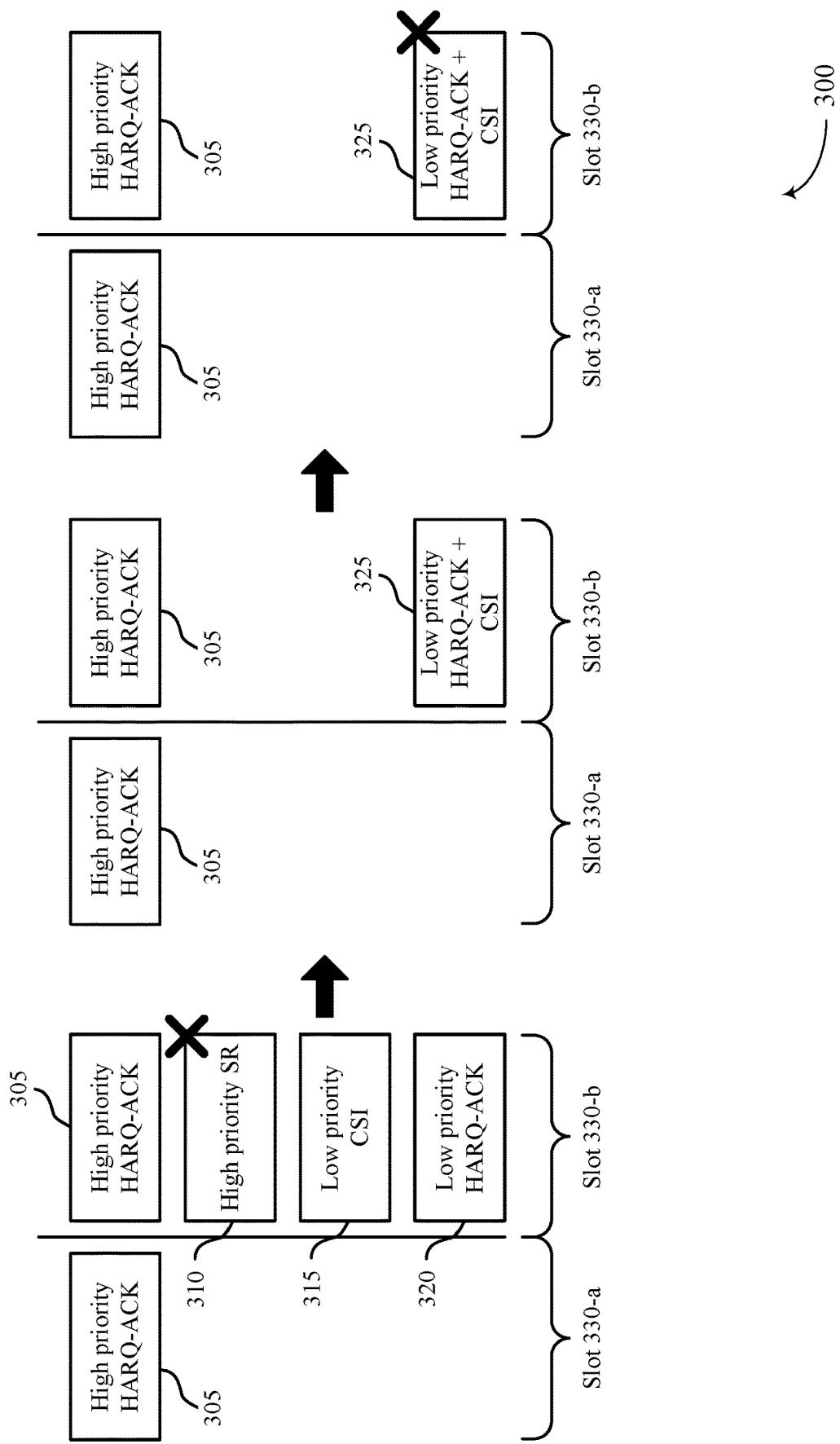
FIGS. 3 through 6 illustrate examples of multi-stage conflict resolution procedures that support managing overlapping between uplink control channel repetitions and uplink data transmissions in accordance with one or more aspects of the present disclosure.

FIG. 3 illustrates an example of a multi-stage conflict resolution procedure 300 that supports managing overlapping between uplink control channel repetitions and uplink data transmissions in accordance with one or more aspects of the present disclosure. In some examples, the multi-stage conflict resolution procedure 300 may be implemented by aspects of the wireless communications systems 100 and 200. For example, the multi-stage conflict resolution procedure 300 may include a prioritization procedure (e.g., a repetition prioritization procedure), an intra-UE multiplexing, or both, and a UE may use the multi-stage conflict resolution procedure 300 to resolve overlapping PUCCHS or overlapping PUCCHs and PUSCHs.

As described herein, a UE may use a multi-stage conflict resolution procedure to resolve an overlap between PUCCHs (e.g., carrying UCI) or PUCCHs and PUSCHs (e.g., carrying uplink data). If an overlapping PUCCH is scheduled with repetitions by a network entity, the UE may first resolve overlapping PUCCHs with a same priority index and then resolve overlapping PUCCHs, PUSCHs, or both with different priority indices, where the resolutions may include a prioritization procedure, an intra-UE multiplexing, or both.

In the example of FIG. 3, the network entity may schedule four channels (e.g., PUCCHs) for transmission by the UE, including a high priority HARQ-ACK 305 with two repetitions in a slot 330-a (e.g., slot n) and a slot 330-b (e.g., slot n+1), and a high priority SR 310, a low priority CSI 315, and a low priority HARQ-ACK 320 in the slot 330-b. To resolve the overlapping channels, the UE may first apply a first stage of the multi-stage conflict resolution procedure to overlapping PUCCHs with a same priority index, independently for each priority index. That is, the UE may apply the first stage to the high priority channels (e.g., the high priority HARQ-ACK 305 with repetitions and the high priority SR 310), and separately to the low priority channels (e.g., the low priority CSI 315 and the low priority HARQ-ACK 320).

The first stage of the multi-stage conflict resolution procedure for the high priority channels may be based on a difference in starting slot index or UCI type, where an earlier starting slot index may have priority over a later starting slot index, and UCI types may be prioritized in the order of HARQ-ACK, SR, and CSI. As such, the high priority HARQ-ACK 305 with repetitions may be prioritized over the high priority SR 310 as a HARQ-ACK has a higher priority UCI type than an SR, and the UE may drop the high priority SR 310. In addition, because the overlapping low priority channels lack repetitions, the UE may perform intra-UE multiplexing on the low priority CSI 315 and the low priority HARQ-ACK 320 to resolve the overlap, where the UE may multiplex the low priority CSI 315 and the low priority HARQ-ACK 320 into a resultant PUCCH. As such, after applying the first stage of the multi-stage conflict resolution procedure to the high priority channels and intra-UE multiplexing to the low priority channels, the resultant channels may include the high priority HARQ-ACK 305 with repetitions in the slot 330-a and the slot 330-b, and a low priority HARQ-ACK+CSI 325 in the slot 330-b. The UE may expect the resultant channel not to overlap with another PUCCH with repetitions that is associated with a same priority index as the resultant channel.

To resolve the overlap between the high priority HARQ-ACK 305 and the low priority HARQ-ACK+CSI 325, the UE may perform a second stage of the multi-stage conflict resolution procedure for channels with different priorities and where the high priority HARQ-ACK 305 has two repetitions across the slots 330. Because of the repetitions, the UE may drop or cancel the low priority HARQ-ACK+CSI 325 in favor of transmitting the high priority HARQ-ACK 305 based on the priorities of the channels (e.g., the UE transmits the higher priority channel).

Figure 4:
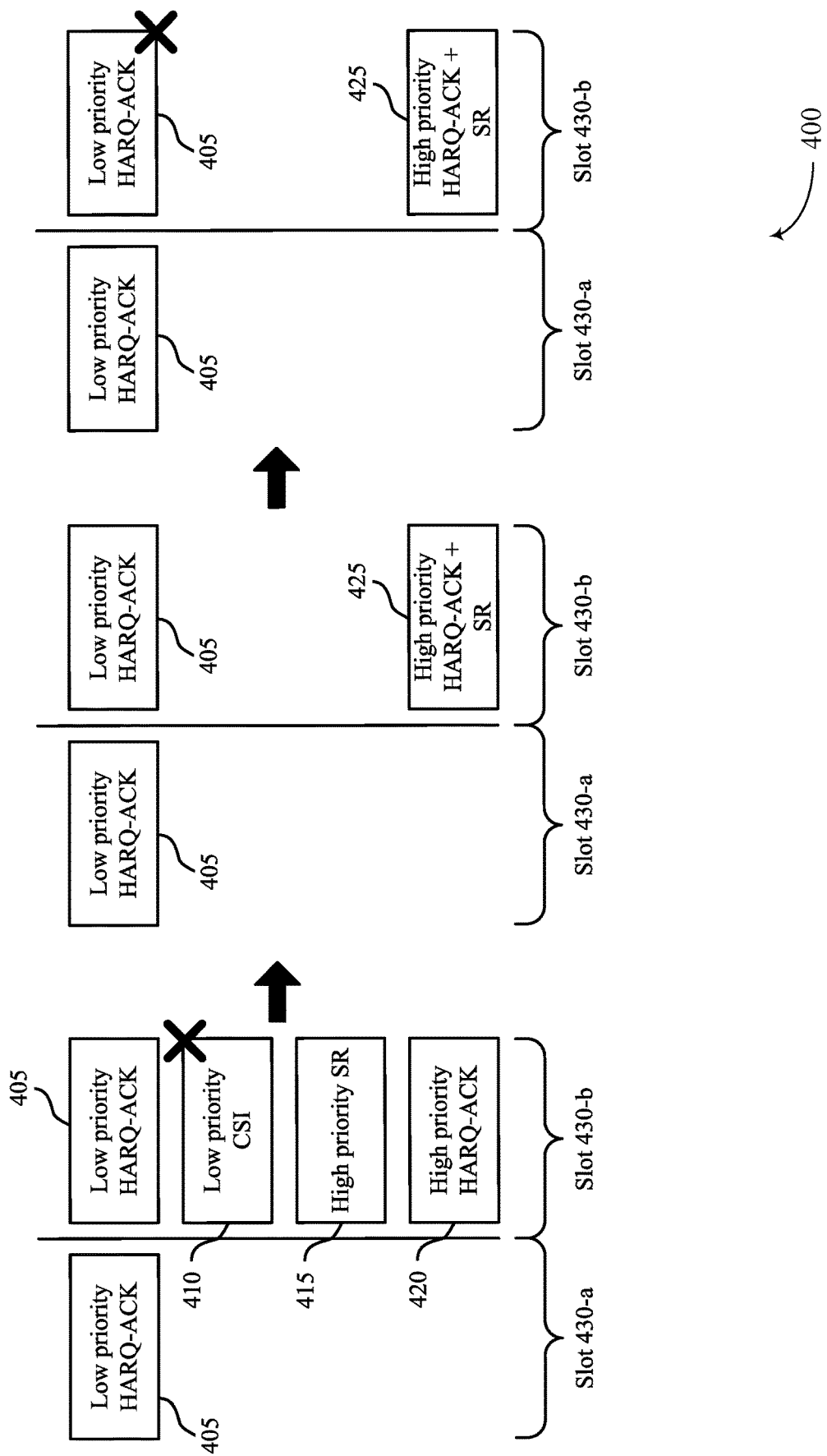

FIG. 4 illustrates an example of a multi-stage conflict resolution procedure 400 that supports managing overlapping between uplink control channel repetitions and uplink data transmissions in accordance with one or more aspects of the present disclosure. In some examples, the multi-stage conflict resolution procedure 400 may be implemented by aspects of the wireless communications systems 100 and 200. For example, the multi-stage conflict resolution procedure 400 may include a prioritization procedure (e.g., a repetition prioritization procedure), an intra-UE multiplexing, or both, and a UE may use the multi-stage conflict resolution procedure 400 to resolve overlapping PUCCHs or overlapping PUCCHs and PUSCHs.

As described herein, a UE may use the multi-stage conflict resolution procedure to resolve an overlap between PUCCHs (e.g., carrying UCI) or PUCCHs and PUSCHs (e.g., carrying uplink data). If an overlapping PUCCH is scheduled with repetitions by a network entity, the UE may first resolve overlapping PUCCHs with a same priority index and then resolve overlapping PUCCHs, PUSCHs, or both with different priority indices, where the resolutions may include a prioritization procedure, an intra-UE multiplexing, or both.

In the example of FIG. 4, the network entity may schedule four channels (e.g., PUCCHs) for transmission by the UE, including a low priority HARQ-ACK 405 with two repetitions in a slot 430-a (e.g., slot n) and a slot 430-b (e.g., slot n+1), and a low priority CSI 410, a high priority SR 415, and a high priority HARQ-ACK 320 in the slot 430-b. To resolve the overlapping channels, the UE may apply a first stage of the multi-stage conflict resolution procedure to overlapping PUCCHs with a same priority index, independently for each priority index. That is, the UE may apply the first stage to the low priority channels (e.g., the low priority HARQ-ACK 405 with repetitions and the low priority CSI 410) and separately to the high priority channels (e.g., the high priority SR 415 and the high priority HARQ-ACK 420).

The first stage of the multi-stage conflict resolution procedure for the low priority channels may be based on a difference in starting slot index or UCI type, where an earlier starting slot index may have priority over a later starting slot index, and UCI types may be prioritized in the order of HARQ-ACK, SR, and CSI. As such, the low priority HARQ-ACK 405 with repetitions may be prioritized over the low priority CSI 410 as a HARQ-ACK has a higher priority UCI type than CSI. As such, the UE may drop the low priority CSI 410. In addition, because the overlapping high priority channels lack repetitions, the UE may perform an intra-UE multiplexing procedure on the high priority SR 415 and the high priority HARQ-ACK 420 to resolve the overlap, where the UE may multiplex the high priority SR 415 and the high priority HARQ-ACK 420 into a same resultant PUCCH. As such, after applying the first stage of the multi-stage conflict resolution procedure to the high priority channels and the first intra-UE multiplexing to the low priority channels, the resultant channels may include the low priority HARQ-ACK 405 with repetitions in the slot 430-a and the slot 430-b, and a high priority HARQ-ACK+SR 425 in the slot 430-b.

To resolve the overlap between the low priority HARQ-ACK 405 and the high priority HARQ-ACK+SR 425, the UE may perform a second stage of the multi-stage conflict resolution procedure for channels with different priorities and where the low priority HARQ-ACK 405 has two repetitions across the slots 430. Because of the repetitions, the UE may at least partially cancel the low priority HARQ-ACK 405 in favor of transmitting the high priority HARQ-ACK+SR 425 based on the priorities of the channels (e.g., the UE transmits the higher priority channel).

Figure 5:
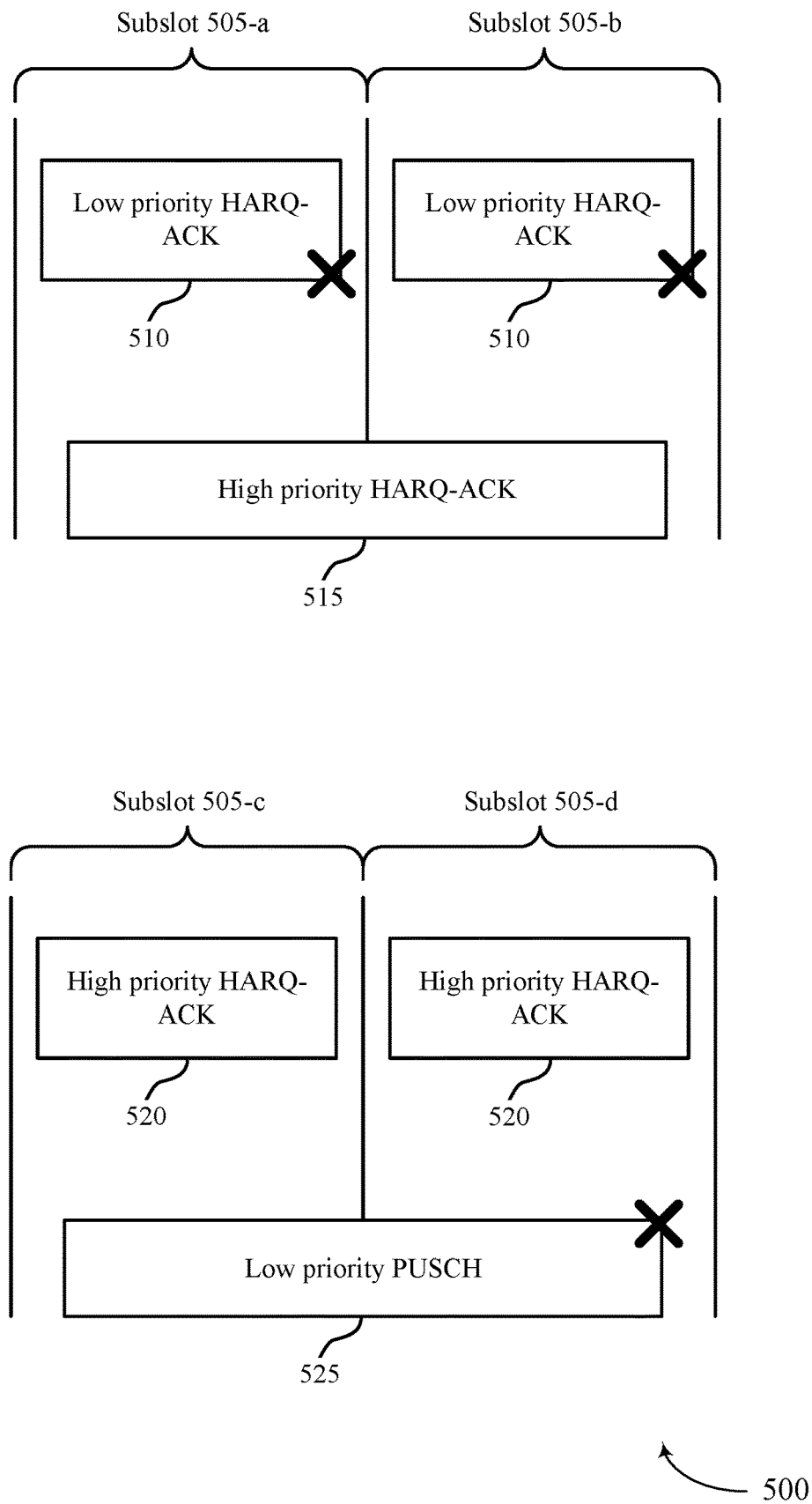

FIG. 5 illustrates an example of a multi-stage conflict resolution procedure 500 that supports managing overlapping between uplink control channel repetitions and uplink data transmissions in accordance with one or more aspects of the present disclosure. In some examples, the multi-stage conflict resolution procedure 500 may be implemented by aspects of the wireless communications systems 100 and 200. For example, the multi-stage conflict resolution procedure 500 may include a prioritization procedure (e.g., a repetition prioritization procedure), an intra-UE multiplexing, or both, and a UE may use the multi-stage conflict resolution procedure 500 to resolve overlapping PUCCHs carrying UCI or overlapping PUCCHs and PUSCHs carrying uplink data.

In some examples, a network entity may schedule two or more repetitions of PUCCHs that overlap with a PUCCH or a PUSCH with different priorities. This may trigger the UE to either drop the two or more PUCCH repetitions or drop the second PUCCH or PUSCH based on corresponding priority indices. In some examples, the PUCCHs may carry HARQ-ACK transmissions and the repetitions may be subslot based. That is, the network entity may schedule multiple repetitions of a HARQ-ACK transmission across multiple subslots 505. A slot may be divided into seven subslots with two symbols each, or into two subslots with seven symbols each. For example, a slot may include two subslots 505, a subslot 505-a (e.g., subslot 0) and a subslot 505-b (e.g., subslot 1), which may each include seven symbols.

The network entity may schedule a low priority HARQ-ACK 510 with a repetition in each of the subslot 505-a and the subslot 505-b, and a single high-priority HARQ-ACK 515 spanning both of the subslots 505. That is, the high-priority HARQ-ACK 515 may overlap with both repetitions of the low priority HARQ-ACK 515 in the subslot 505-a and the subslot 505-b. To resolve the overlap, the UE may at least partially cancel both repetitions of the low priority HARQ-ACK 510 and transmit the high-priority HARQ-ACK 515, given that the UE may have performed a prioritization procedure prior to an intra-UE multiplexing, which may enable the UE to resolve the overlapping channels, where some of the channels may be scheduled with repetitions and some without. In this way, the network entity may schedule multiple repetitions of the low priority HARQ-ACK 510 across different subslots 505, and the UE may transmit any low priority HARQ-ACK 510 repetitions that are non-overlapping with any other channels (e.g., in this case, the high priority HARQ-ACK 515). This enables multiple repetitions to be scheduled by the network entity and transmitted by the UE even if other repetitions may be canceled.

Additionally, or alternatively, the network entity may schedule a high priority HARQ-ACK 520 with a repetition in each of a subslot 505-c and a subslot 505-d, and a single low priority PUSCH 525 spanning both of the subslots 505. That is, the low-priority PUSCH 525 may overlap with both repetitions of the high priority HARQ-ACK 520 in the subslot 505-c and the subslot 505-c. To resolve the overlap, the UE may at least partially cancel the low priority PUSCH 525 and transmit both repetitions of the high-priority HARQ-ACK 520, given that the UE may have performed a prioritization procedure prior to an intra-UE multiplexing, which may enable the UE to resolve the overlapping channels, where some of the channels may be scheduled with repetitions and some without.

Figure 6:
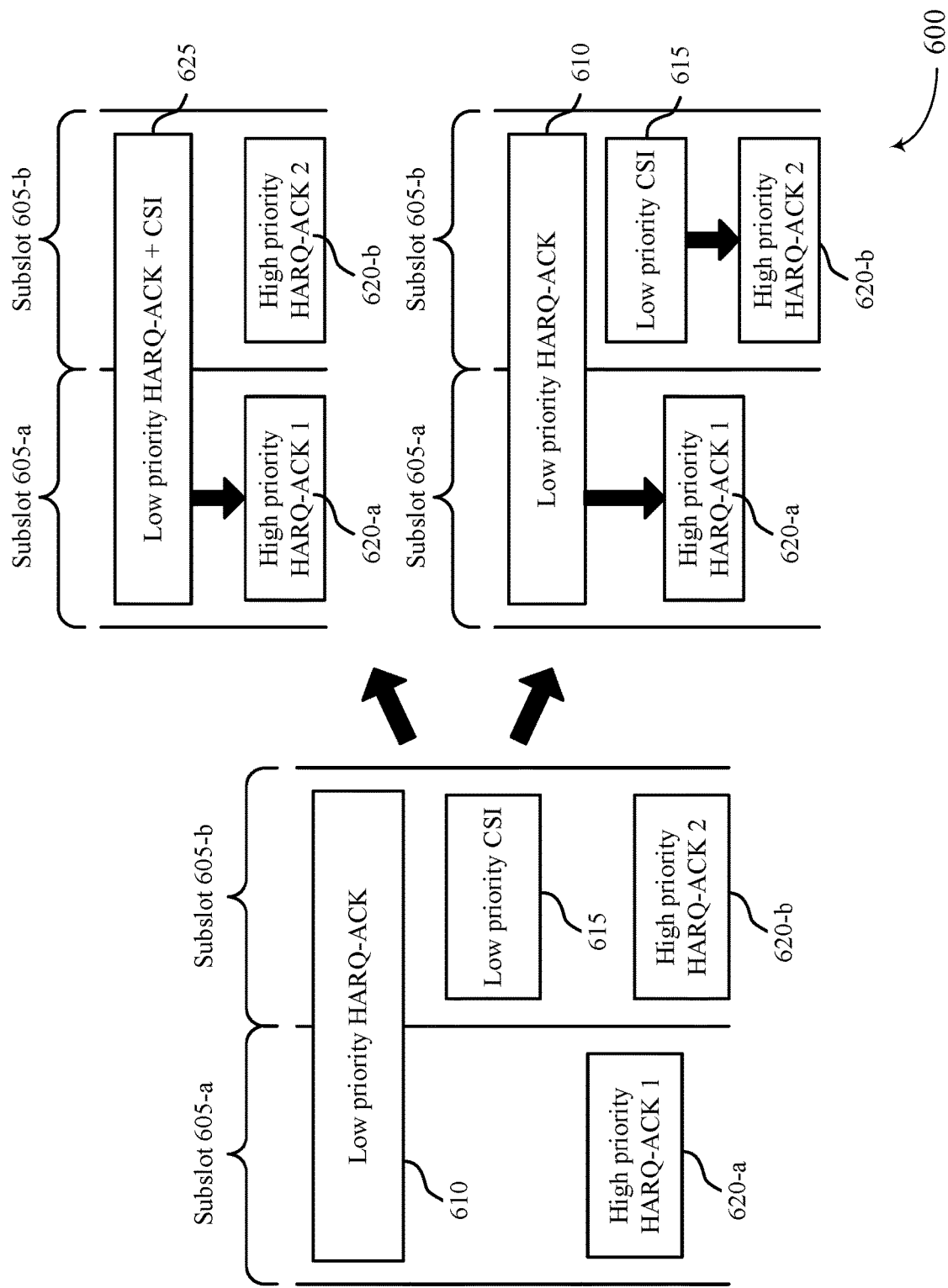

FIG. 6 illustrates an example of a multi-stage conflict resolution procedure 600 that supports managing overlapping between uplink control channel repetitions and uplink data transmissions in accordance with one or more aspects of the present disclosure. In some examples, the multi-stage conflict resolution procedure 600 may be implemented by aspects of the wireless communications systems 100 and 200. For example, the multi-stage conflict resolution procedure 600 may include a prioritization procedure (e.g., a repetition prioritization procedure), an intra-UE multiplexing, or both, and a UE may use the multi-stage conflict resolution procedure 600 to resolve overlapping PUCCHs carrying UCI or overlapping PUCCHs and PUSCHs carrying uplink data.

In some examples, a network entity may schedule overlapping PUCCHs to be transmitted by the UE, and where the overlapping PUCCHs may have a same priority index or different priority indices. As described with reference to FIG. 2, any overlapping PUCCHs within a given time unit (e.g., a slot, subslot) may satisfy an intra-UE multiplexing timeline. In some examples, high priority channels and low priority channels may be configured with different time units. For example, the high priority channels may be configured with a subslot-based duration, while the low priority channels may be configured with a slot-based duration. Alternatively, the high priority channels may be configured with the slot-based duration, while the low priority channels may be configured with the subslot-based duration. If overlapping high priority channels and low priority channels are configured with different time units, the UE may identify a time unit for which to resolve the overlapping channels using a prioritization procedure (e.g., repetition prioritization procedure), intra-UE multiplexing, or a combination thereof, which may be a time unit corresponding to the high priority channel.

In determining to associate overlapping high priority channels and low priority channels (e.g., overlapping PUCCHs or overlapping PUCCHs and PUSCHs) with a high priority time unit (e.g., slot, subslot), the UE may use a set of rules to associate low priority channels to the high priority time unit. In some examples, the association may be based on a first overlapping high priority time unit as the time unit for the low priority channel. That is, the low priority channel may be associated with the first overlapping high priority time unit that includes any overlapping high priority channel. In some other examples, the association may be based on a first overlapping high priority time unit that includes a high priority HARQ-ACK. If no HARQ-ACK transmissions are scheduled, the association may be based on the first overlapping high priority time unit regardless of the UCI type. In some cases, the association may be based on a last overlapping high priority time unit. That is, the time unit associated with a last high priority channel that overlaps with another channel may be associated with the low priority channel.

The UE may associate the low priority channels with a high priority time unit using the association conditions at different stages in the multi-stage conflict resolution procedure. In some examples, the UE may associate the low priority channels with a high priority time unit before resolving any overlapping channels with the same priority (e.g., before resolving a group of low priority or high priority overlapping channels). As such, the UE may associate each overlapping low priority channel with a high priority time unit. In some examples, two overlapping, low priority channels may be associated with two different high priority time units. In such cases, although the two low priority channels are overlapping, because they are associated with different high priority time units, the UE may refrain from multiplexing the two low priority channels together in an intra-UE multiplexing procedure.

In some cases, the UE may associate the low priority channels with the high priority time unit after performing a collision resolution procedure (e.g., a prioritization procedure or an intra-UE multiplexing procedure) on a group of overlapping channels that share a same low priority. That is, any resultant/remaining low priority channels may be non-overlapping with each other when the UE associates the low priority channels with the high priority time unit. In this way, the UE may multiplex together UCI in overlapping low priority channels before associating the low priority channels with the high priority time unit, where a resultant channel of the multiplexing may be associated with the high priority time unit.

In the example of FIG. 6, the network entity may schedule multiple channels to be transmitted by the UE across a high priority time unit. The high priority time unit may include a slot or a subslot, where the slot may be divided into a subslot 605-a (e.g., subslot 0) and a subslot 605-b (e.g., subslot 1). For example, the network entity may schedule a low priority HARQ-ACK 610 spanning the subslot 605-a and the subslot 605-b (e.g., the entire slot), a low priority CSI 615 in the subslot 605-b, a high priority HARQ-ACK 620-a (e.g., high priority HARQ-ACK 1, or a first high priority HARQ-ACK) in the subslot 605-a, and a high priority HARQ-ACK 620-b (e.g., high priority HARQ-ACK 2, or a second high priority HARQ-ACK) in the subslot 605-b. In some examples, the high priority HARQ-ACK 620-b may be a repetition of the high priority HARQ-ACK 620-a. In some examples, the high priority HARQ-ACK 620-a and the high priority HARQ-ACK 620-b may be different transmissions.

In some cases, based on identifying the overlapping channels in the subslots 605, the UE may first resolve overlapping channels with a same low priority. For example, because the low priority channels (e.g., the low priority HARQ-ACK 610 and the low priority CSI 615) lack repetitions and share the same low priority, the UE may perform intra-UE multiplexing to multiplex the low priority HARQ-ACK 610 and the low priority CSI 615 into a low priority HARQ-ACK+CSI 625 (e.g., a same channel). After performing the intra-UE multiplexing, the UE may determine how to associate the resultant low priority HARQ-ACK+CSI 625 with a high priority time unit (e.g., the subslot 605-a or the subslot 605-b). For example, the UE may associate the low priority HARQ-ACK+CSI 625 with the subslot 605-a, which is the time unit associated with the first overlapping high priority channel (e.g., the high-priority HARQ-ACK 620-a). As such, the UE may multiplex the low priority HARQ-ACK 610 and the low priority CSI 615 into the subslot 605-a (e.g., rather than across the entire slot).

In some examples, the UE may associate the low priority channels (e.g., the low priority HARQ-ACK 610 and the low priority CSI 615) with a high priority time unit before resolving any overlapping channels, where each low priority channel may be associated with a different high priority time unit. For example, the UE may associate the low priority HARQ-ACK 610 with the subslot 605-a based on a first overlapping high priority time unit that includes a high priority HARQ-ACK (e.g., the high-priority HARQ-ACK 620-a), and the UE may associate the low priority CSI 615 with the subslot 605-a based on a last overlapping high priority time unit. Then, the UE may use the multi-stage conflict resolution procedure to resolve the overlapping channels on each subslot 605 independently. As such, the time in the multi-stage conflict resolution procedure at which the UE associates the low priority channels with a high priority time unit may impact the result of an overlapping channel resolution.

Figure 7:
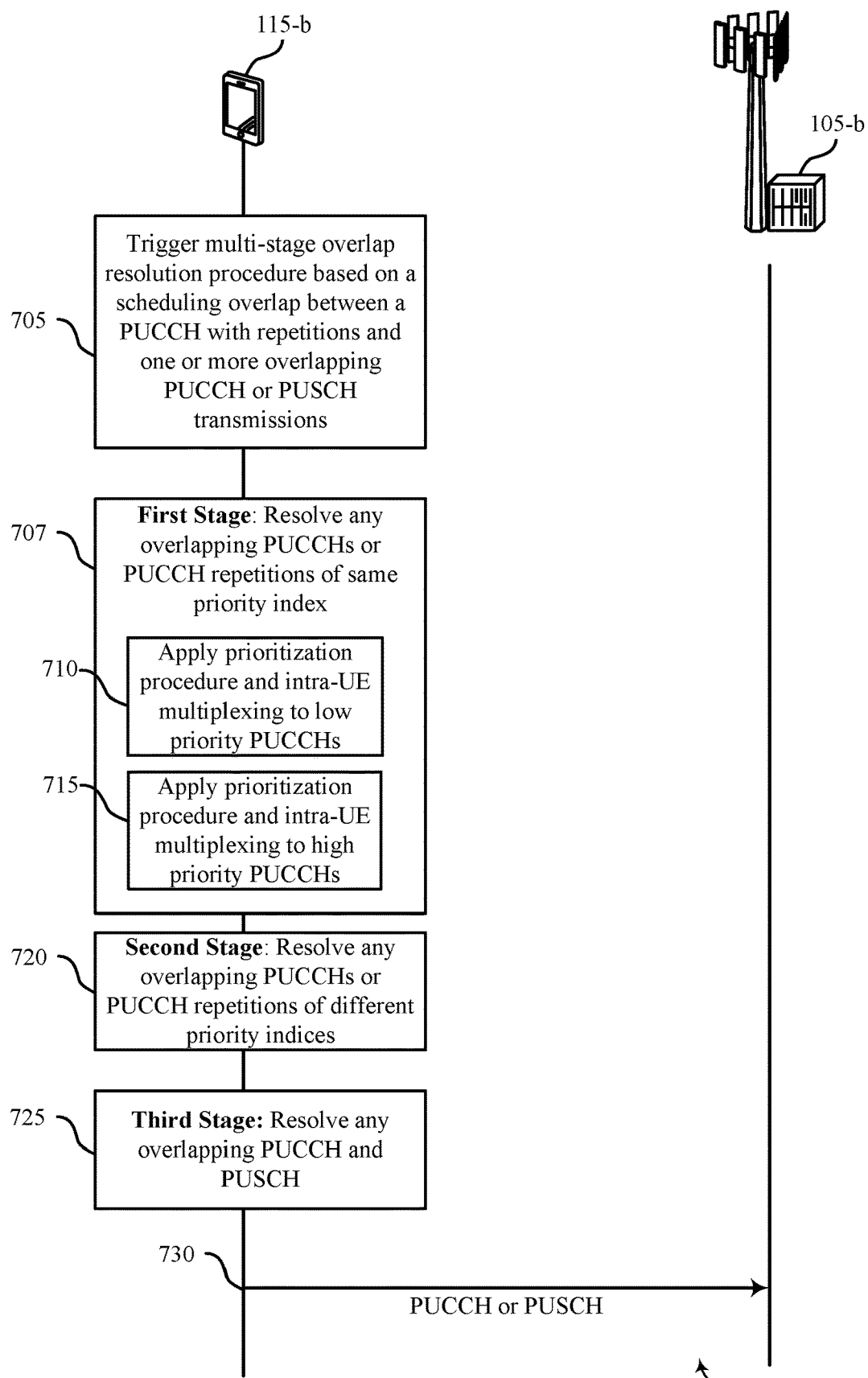
FIG. 7 illustrates an example of a process flow that supports managing overlapping between uplink control channel repetitions and uplink data transmissions in accordance with one or more aspects of the present disclosure.

FIG. 7 illustrates an example of a process flow 700 that supports managing overlapping between uplink control channel repetitions and uplink data transmissions in accordance with one or more aspects of the present disclosure. The process flow 700 may implement aspects of wireless communications systems 100 and 200, or may be implemented by aspects of the wireless communications system 100 and 200. For example, the process flow 700 may illustrate operations between a UE 115-b and a network entity 105-b, which may be examples of corresponding devices described herein. In the following description of the process flow 700, the operations between the UE 115-b and the network entity 105-b may be transmitted in a different order than the example order shown, or the operations performed by the UE 115-b and the network entity 105-b may be performed in different orders or at different times. Some operations may also be omitted from the process flow 700, and other operations may be added to the process flow 700.

At 705, the UE 115-b may identify one or more scheduling overlaps associated with one or more repetitions of a first PUCCH. That is, the network entity 105-b may schedule multiple overlapping PUCCH transmissions carrying UCI, PUSCH transmissions carrying uplink data, or both for the UE 115-b, where at least one of the PUCCHs may be scheduled with repetitions. The PUCCHs and PUSCHs may overlap in time, causing a collision or scheduling conflict. This scenario may trigger one or more stages of a multi-stage conflict resolution procedure, which may include prioritization procedures, intra-UE multiplexing procedures, or a combination thereof. The multi-stage conflict resolution procedure may alternatively be referred to as a multi-stage overlap resolution procedure because the procedure addresses conflicts arising from scheduling overlaps.

At 707, the UE 115-b may perform a first stage of the multi-stage conflict resolution procedure. In the first stage, the UE 115-b may resolve any overlapping PUCCHs or PUCCH repetitions of a same priority index. During the first stage, at 710, the UE 115-b may first apply a first prioritization procedure (e.g., a repetition prioritization procedure) or a first intra-UE multiplexing procedure to a group of overlapping PUCCHs carrying UCI with a same, low priority index (e.g., associated with or having a priority index X, where X indicates a low priority). As such, the UE 115-b may first resolve overlapping PUCCHs independently for that the low priority index (e.g., X). In some examples, the first prioritization procedure may be based on a set of prioritization rules, which may indicate for the UE 115-b to prioritize a PUCCH based on a starting slot index (e.g., a time at which a PUCCH is scheduled to start being transmitted) or a UCI-type priority (e.g., a priority of the type of UCI, including a HARQ-ACK, an SR, or CSI, carried in the PUCCHs).

In some examples during the first stage, the UE 115-b may apply the first intra-UE multiplexing procedure to the group of overlapping PUCCHs with the low priority index (e.g., having the priority index X) with repetition, if applicable. That is, if at least one of the overlapping PUCCHs is scheduled with repetitions, the UE 115-b may multiplex the UCI of the overlapping PUCCHs into one PUCCH to resolve the overlap.

During the first stage, at 715, the UE 115-b may apply a second prioritization procedure or a second intra-UE multiplexing procedure for a group of overlapping PUCCHs with a same high priority index (e.g., associated with or having a priority index Y, where Y indicates a low priority). As such, the UE 115-b may resolve overlapping PUCCHs independently for the high priority index (e.g., Y). In some examples, the second prioritization procedure may be based on a set of prioritization rules, which may indicate for the UE 115-b to prioritize a PUCCH based on a starting slot index (e.g., a time at which a PUCCH is scheduled to start being transmitted) or a UCI-type priority (e.g., a priority of the type of UCI, including a HARQ-ACK, an SR, or CSI, carried in the PUCCHs).

In some examples during the first stage, the UE 115-b may apply the second intra-UE multiplexing procedure to the group of overlapping PUCCHs with the same high priority (e.g., having the priority index X) with repetition, if applicable. That is, if at least one of the overlapping PUCCHs is scheduled with repetitions, the UE 115-*b* may multiplex the UCI of the overlapping PUCCHs into one PUCCH to resolve the overlap.

At 720, the UE 115-*b* may perform a second stage of the multi-stage conflict resolution procedure to resolve any overlapping PUCCHs carrying UCI or PUCCH repetitions of different priority indices. For example, the UE 115-*b* may apply a third prioritization procedure to any overlapping PUCCHs with different priorities (e.g., low priority PUCCHs and high priority PUCCHs). If any of the overlapping PUCCHs is scheduled with a repetition, the UE 115-*b* may resolve any overlap between the PUCCH with the repetitions and the other PUCCHs based on the priorities of each PUCCH. For example, the UE 115-*b* may at least partially cancel or drop an overlapping PUCCH with a lower priority index.

After the third prioritization procedure during the second stage, the UE 115-*b* may apply a third intra-UE multiplexing procedure between the PUCCHs with different priorities. If none of the overlapping PUCCHs are scheduled with repetitions, the UE 115-*a* may multiplex the UCI of the overlapping PUCCHs into one PUCCH to resolve the overlap.

At 725, the UE 115-*b* may perform a third stage of the multi-stage conflict resolution procedure to resolve any overlapping PUCCH carrying UCI and PUSCH carrying uplink data, where the PUCCH and the PUSCH may be associated with different priority indices. That is, during the third stage, the UE 115-*b* may resolve any overlapping PUCCHs and PUSCHs remaining after the first stage and the second stage. The UE 115-*b* may apply a fourth prioritization procedure to any overlapping PUCCHs and PUSCHs with different priorities. If an overlapping PUCCH is scheduled with repetitions, the UE 115-*b* may resolve the overlap between the PUCCH and a PUSCH based on the priorities of each of the PUCCH and the PUSCH. For example, the UE 115-*b* may at least partially cancel or drop the PUSCH if it has a lower priority than the PUCCH.

After the fourth prioritization procedure of the third stage, the UE 115-*b* may apply a fourth intra-UE multiplexing procedure to the overlapping PUCCH and PUSCH with different priorities. If the PUCCH lacks scheduling with repetitions, the UE 115-*b* may piggyback UCI in the PUCCH onto the PUSCH to resolve the overlap.

At 730, based on resolving overlapping according to the multi-stage conflict resolution procedure, the UE 115-*b* may selectively transmit at least a portion of a PUCCH (e.g., UCI) or PUSCH (e.g., uplink data) transmission to the network entity 105-*b* according to the prioritization procedures and the intra-UE multiplexing.

Figure 8:
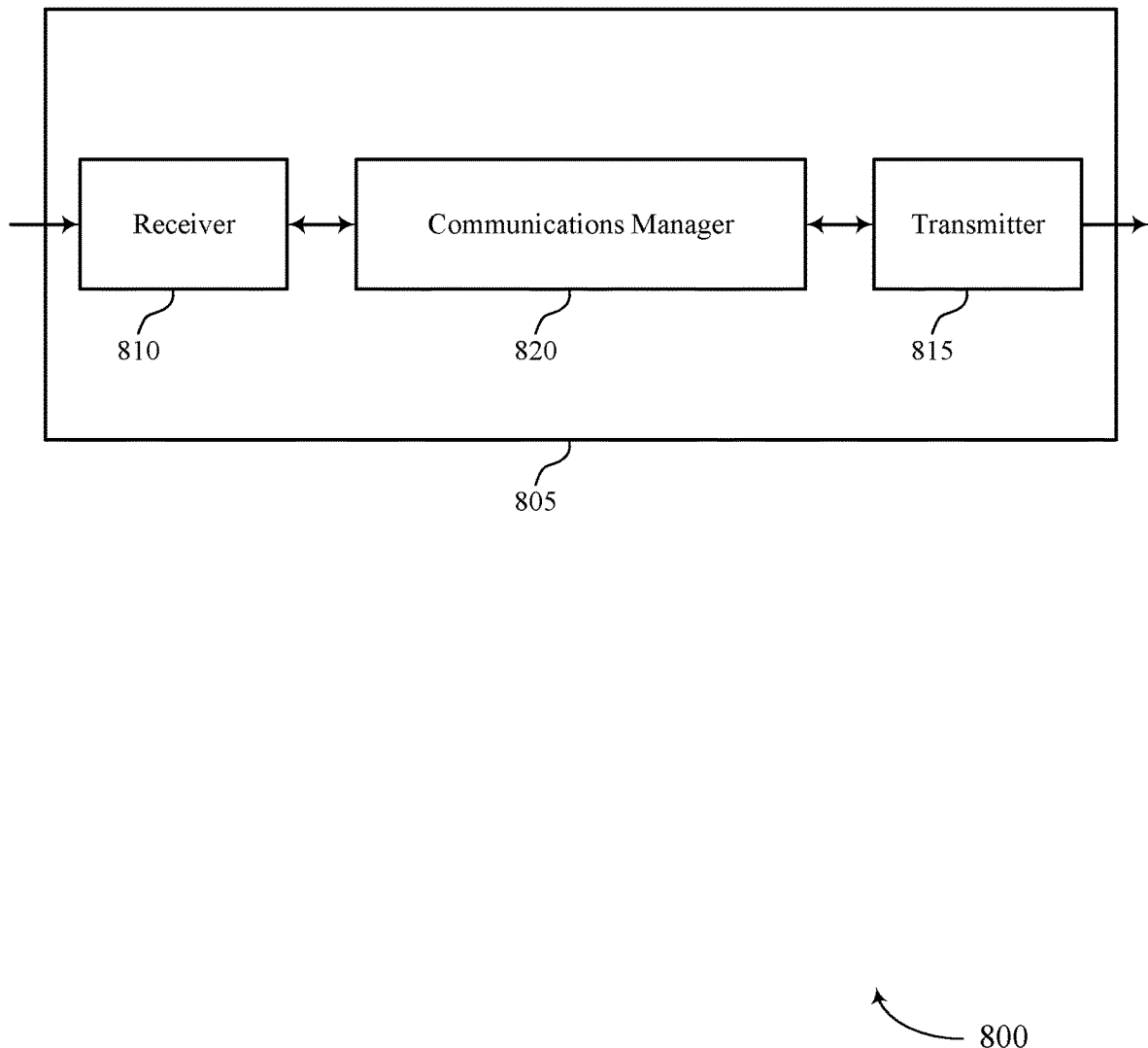
FIGS. 8 and 9 show block diagrams of devices that support managing overlapping between uplink control channel repetitions and uplink data transmissions in accordance with one or more aspects of the present disclosure.

FIG. 8 shows a block diagram 800 of a device 805 that supports managing overlapping between uplink control channel repetitions and uplink data transmissions in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to managing overlapping between uplink control channel repetitions and uplink data transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to managing overlapping between uplink control channel repetitions and uplink data transmissions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of managing overlapping between uplink control channel repetitions and uplink data transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software) executed by a processor. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 may be configured as or otherwise support a means for performing one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage may be based on a difference between overlapping UCI of a same priority index, where the overlapping UCI includes one or more of: the first UCI, a second UCI associated with a priority index of the first UCI, or at least a portion of the one or more overlapping uplink transmissions. The second stage may be based on overlap resolution between the first UCI and a third UCI associated with a priority index different from the priority index of the first UCI, the first UCI and the third UCI associated with the one or more overlapping uplink transmissions. The third stage may be based on overlap resolution between the first UCI and an uplink data transmission associated with a priority index different from the priority index of the first UCI, the first UCI and the uplink data transmission associated with the one or more overlapping uplink transmissions. The communications manager 820 may be configured as or otherwise support a means for transmitting at least a portion of the first UCI or the one or more overlapping uplink transmissions according to the one or more stages of the multi-stage overlap resolution procedure.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for managing overlapping uplink control channel repetitions and uplink data transmissions, which may increase how many channel repetitions a UE may transmit with the transmitter 815, instead of drop, thereby increasing transmission success rates and enabling network entities to schedule more repetitions.

Figure 9:
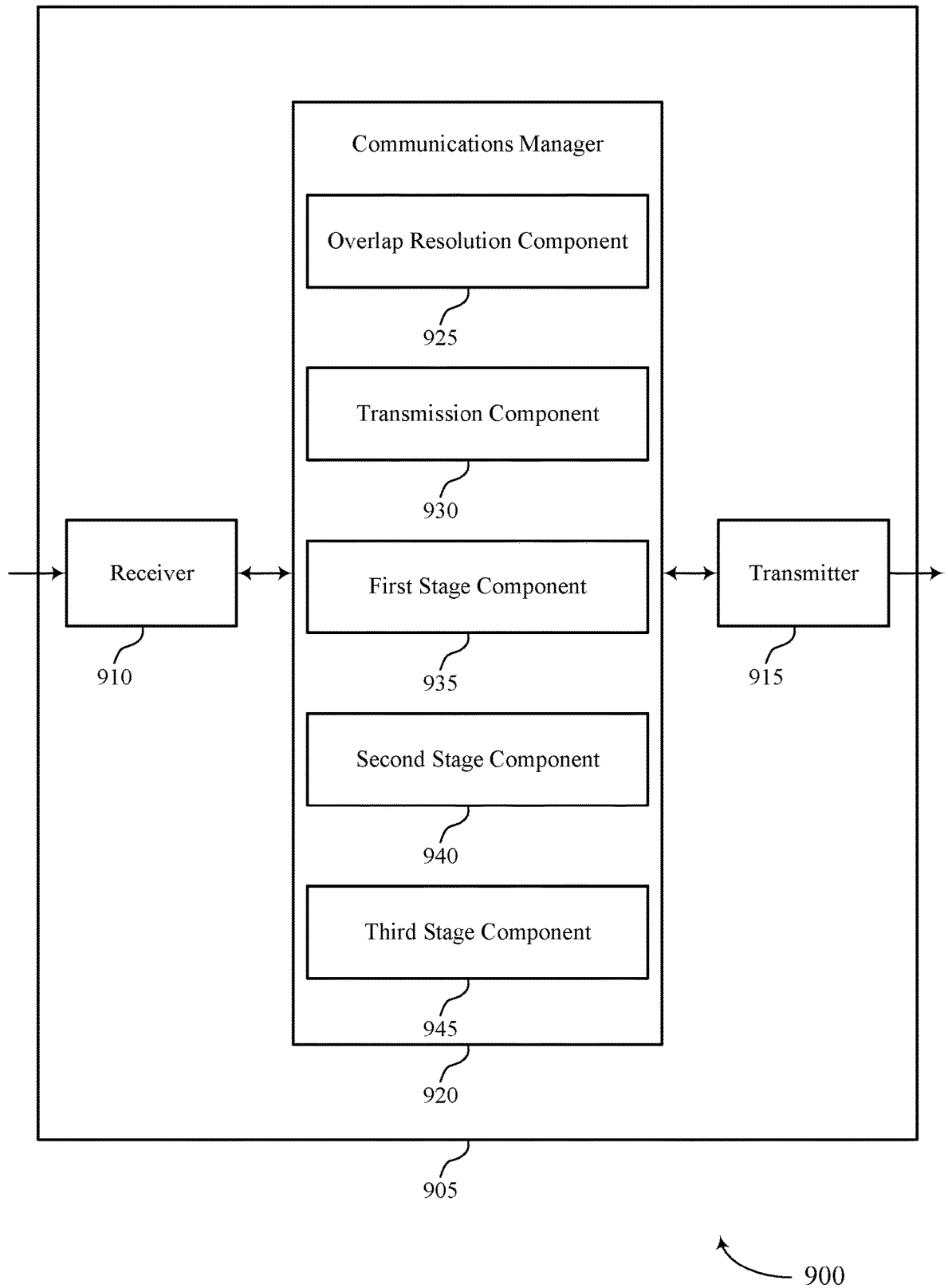

FIG. 9 shows a block diagram 900 of a device 905 that supports managing overlapping between uplink control channel repetitions and uplink data transmissions in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to managing overlapping between uplink control channel repetitions and uplink data transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to managing overlapping between uplink control channel repetitions and uplink data transmissions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of managing overlapping between uplink control channel repetitions and uplink data transmissions as described herein. For example, the communications manager 920 may include an overlap resolution component 925 a transmission component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The overlap resolution component 925 may be configured as or otherwise support a means for performing one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage component 935 may be configured as or otherwise support a means for performing the first stage based on a difference between overlapping UCI of a same priority index, where the overlapping UCI includes one or more of: the first UCI, a second UCI associated with a priority index of the first UCI, or at least a portion of the one or more overlapping uplink transmissions. The second stage component 940 may be configured as or otherwise support a means for performing the second stage based on overlap resolution between the first UCI and a third UCI associated with a priority index different from the priority index of the first UCI, the first UCI and the third UCI associated with the one or more overlapping uplink transmissions. The third stage component 945 may be configured as or otherwise support a means for performing the third stage based on overlap resolution between the first UCI and an uplink data transmission associated with a priority index different from the priority index of the first UCI, the first UCI and the uplink data transmission associated with the one or more overlapping uplink transmissions. The transmission component 930 may be configured as or otherwise support a means for transmitting at least a portion of the first UCI or the one or more overlapping uplink transmissions according to the one or more stages of the multi-stage overlap resolution procedure.

Figure 10:
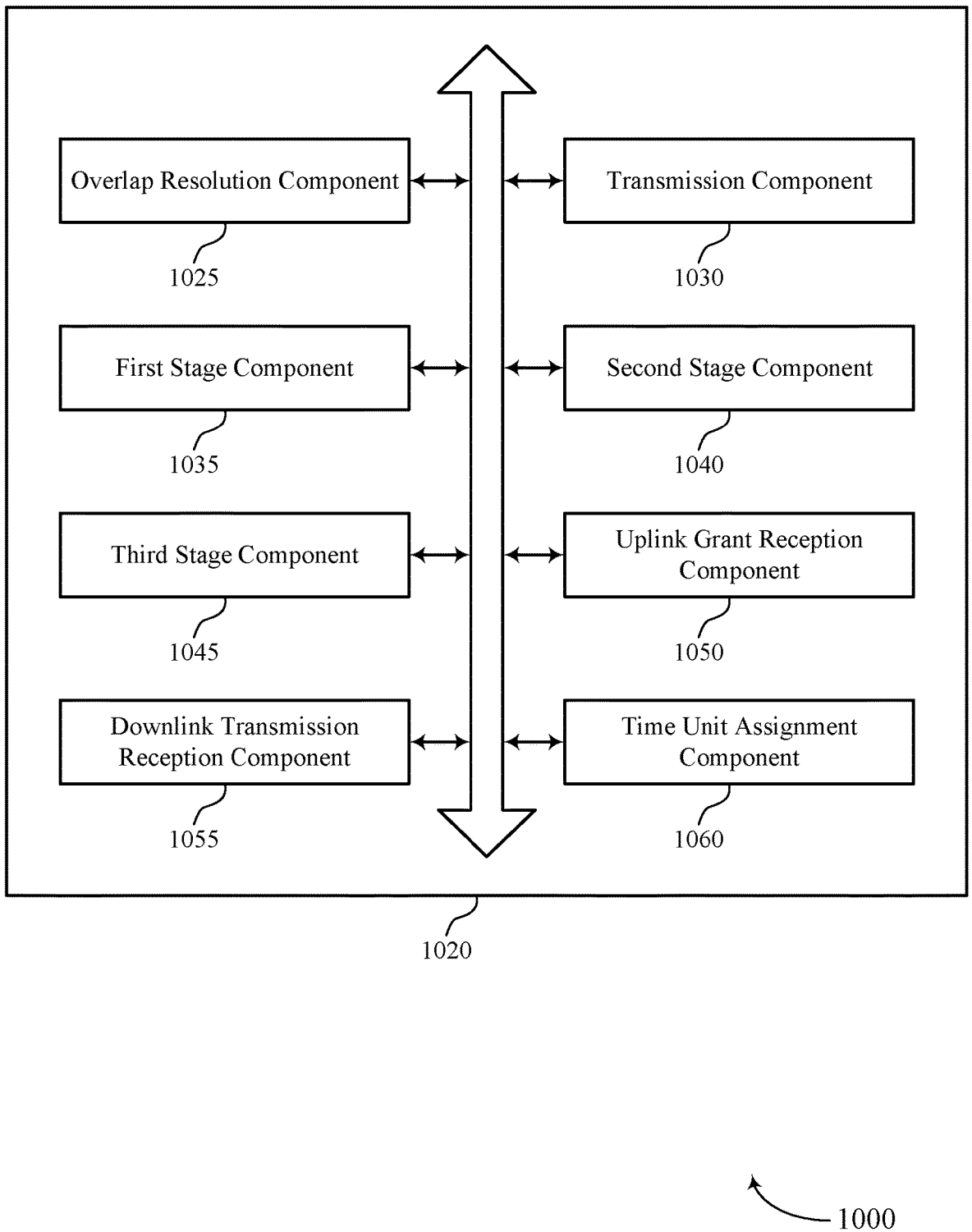
FIG. 10 shows a block diagram of a communications manager that supports managing overlapping between uplink control channel repetitions and uplink data transmissions in accordance with one or more aspects of the present disclosure.

FIG. 10 shows a block diagram 1000 of a communications manager 1020 that supports managing overlapping between uplink control channel repetitions and uplink data transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of managing overlapping between uplink control channel repetitions and uplink data transmissions as described herein. For example, the communications manager 1020 may include an overlap resolution component 1025, a transmission component 1030, a first stage component 1035, a second stage component 1040, a third stage component 1045, an uplink grant reception component 1050, a downlink transmission reception component 1055, a time unit assignment component 1060, or any combination thereof. Each of these components may communicate, directly or indirectly, with one another (e.g., via one or more buses).

The overlap resolution component 1025 may be configured as or otherwise support a means for performing one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage component 1035 may be configured as or otherwise support a means for performing the first stage based on a difference between overlapping UCI of a same priority index, where the overlapping UCI includes one or more of: the first UCI, a second UCI associated with a priority index of the first UCI, or at least a portion of the one or more overlapping uplink transmissions. The second stage component 1040 may be configured as or otherwise support a means for performing the second stage based on overlap resolution between the first UCI and a third UCI associated with a priority index different from the priority index of the first UCI, the first UCI and the third UCI associated with the one or more overlapping uplink transmissions. The third stage component 1045 may be configured as or otherwise support a means for performing the third stage based on overlap resolution between the first UCI and an uplink data transmission associated with a priority index different from the priority index of the first UCI, the first UCI and the uplink data transmission associated with the one or more overlapping uplink transmissions. The transmission component 1030 may be configured as or otherwise support a means for transmitting at least a portion of the first UCI or the one or more overlapping uplink transmissions according to the one or more stages of the multi-stage overlap resolution procedure.

In some examples, to support performing the one or more stages of the multi-stage overlap resolution procedure, the first stage component 1035 may be configured as or otherwise support a means for performing the first stage separately for each priority index of a set of multiple priority indices.

In some examples, to support performing the one or more stages of the multi-stage overlap resolution procedure, the second stage component 1040 may be configured as or otherwise support a means for selectively dropping during the second stage either a repetition of the one or more repetitions of the first UCI or the third UCI, where the dropping is based on the priority index of the first UCI and the priority index of the third UCI.

In some examples, to support performing the one or more stages of the multi-stage overlap resolution procedure, the third stage component 1045 may be configured as or otherwise support a means for selectively dropping during the third stage either a repetition of the one or more repetitions of the first UCI or the uplink data transmission, where the dropping is based on the priority index of the first UCI and the priority index of the uplink data transmission.

In some examples, to support transmitting at least the portion of the first UCI, the transmission component 1030 may be configured as or otherwise support a means for selectively dropping a repetition of the one or more repetitions of the first UCI and transmitting a remaining portion of the one or more repetitions of the first UCI.

In some examples, the uplink grant reception component 1050 may be configured as or otherwise support a means for receiving an uplink grant for the uplink data transmission within a first processing time defined for the UE. In some examples, the downlink transmission reception component 1055 may be configured as or otherwise support a means for receiving a downlink transmission triggering one or more of: the first UCI, the second UCI, or the third UCI within a second processing time defined for the UE. In some examples, one or both of the second UCI or the third UCI has no repetitions.

In some examples, to support performing the one or more stages of the multi-stage overlap resolution procedure, the second stage component 1040 may be configured as or otherwise support a means for dropping a set of multiple repetitions of the one or more repetitions of the first UCI during the second stage when the third UCI is scheduled to overlap with the set of multiple repetitions of the one or more repetitions of the first UCI and the priority index of the first UCI indicates a lower priority than the priority index of the third UCI.

In some examples, to support performing the one or more stages of the multi-stage overlap resolution procedure, the second stage component 1040 may be configured as or otherwise support a means for dropping the third UCI during the second stage when the third UCI is scheduled to overlap with a set of multiple repetitions of the one or more repetitions of the first UCI and the priority index of the first UCI indicates a higher priority than the priority index of the second UCI.

In some examples, to support performing the one or more stages of the multi-stage overlap resolution procedure, the third stage component 1045 may be configured as or otherwise support a means for dropping a set of multiple repetitions of the one or more repetitions of the first UCI during the third stage when the uplink data transmission is scheduled to overlap with the set of multiple repetitions of the one or more repetitions of the first UCI and the priority index of the first UCI indicates a lower priority than the priority index of the uplink data transmission.

In some examples, to support performing the one or more stages of the multi-stage overlap resolution procedure, the third stage component 1045 may be configured as or otherwise support a means for dropping the uplink data transmission during the third stage when the uplink data transmission is scheduled to overlap with a set of multiple repetitions of the one or more repetitions of the first UCI and the priority index of the first UCI indicates a higher priority than the priority index of the uplink data transmission.

In some examples, one or more of the first UCI, the second UCI, the third UCI, or the uplink data transmission is scheduled using a first time unit that is longer than second time unit, where another of the first UCI, the second UCI, or the uplink data transmission is scheduled using the second time unit.

In some examples, the time unit assignment component 1060 may be configured as or otherwise support a means for assigning the one or more of the first UCI, the second UCI, the third UCI, or the uplink data transmission to a time period corresponding to the second time unit prior to performing the first stage of the multi-stage overlap resolution procedure.

In some examples, the time unit assignment component 1060 may be configured as or otherwise support a means for assigning the one or more of the first UCI, the second UCI, the third UCI, or the uplink data transmission to a time period corresponding to the second time unit between performing the first stage and performing the second stage of the multi-stage overlap resolution procedure.

In some examples, the first stage is based on a difference in starting slot index or UCI type between the overlapping UCI of the same priority index.

Figure 11:
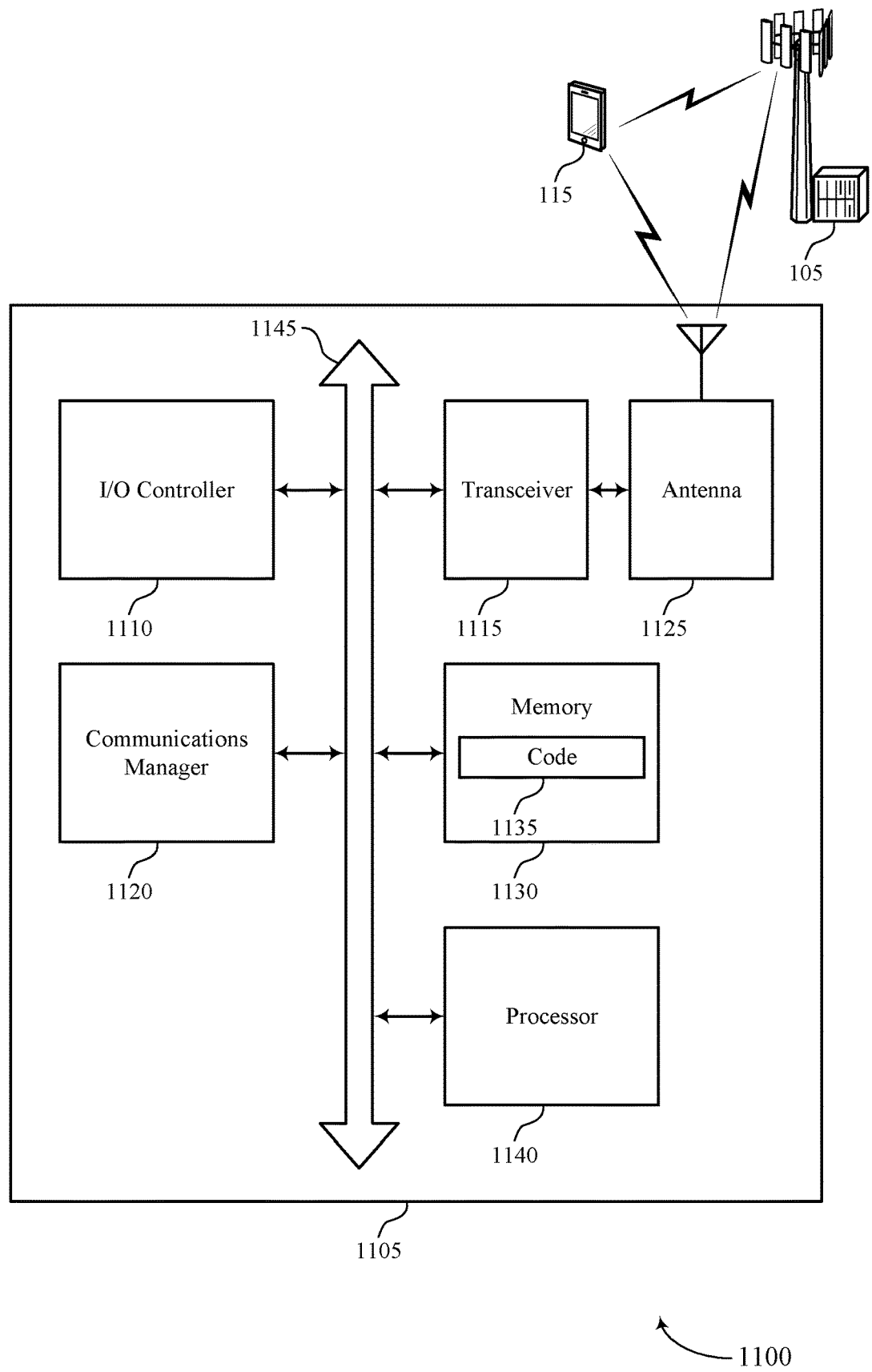
FIG. 11 shows a diagram of a system including a device that supports managing overlapping between uplink control channel repetitions and uplink data transmissions in accordance with one or more aspects of the present disclosure.

FIG. 11 shows a diagram of a system 1100 including a device 1105 that supports managing overlapping between uplink control channel repetitions and uplink data transmissions in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly for the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting managing overlapping between uplink control channel repetitions and uplink data transmissions). For example, the device 1105 or a component of the device 1105 may include a processor 1140 and memory 1130 coupled with or to the processor 1140, the processor 1140 and memory 1130 configured to perform various functions described herein.

For example, the communications manager 1120 may be configured as or otherwise support a means for performing one or more stages of a multi-stage overlap resolution procedure based on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The first stage may be based on a difference between overlapping UCI of a same priority index, where the overlapping UCI includes one or more of: the first UCI, a second UCI associated with a priority index of the first UCI, or at least a portion of the one or more overlapping uplink transmissions. The second stage may be based on overlap resolution between the first UCI and a third UCI associated with a priority index different from the priority index of the first UCI, the first UCI and the third UCI associated with the one or more overlapping uplink transmissions. The third stage based on overlap resolution between the first UCI and an uplink data transmission associated with a priority index different from the priority index of the first UCI, the first UCI and the uplink data transmission associated with the one or more overlapping uplink transmissions. The communications manager 1120 may be configured as or otherwise support a means for transmitting at least a portion of the first UCI or the one or more overlapping uplink transmissions according to the one or more stages of the multi-stage overlap resolution procedure.

By including or configuring the communications manager 1120 in accordance with examples as described herein, the device 1105 may support techniques for managing overlapping uplink control channel repetitions and uplink data transmissions, which may increase how many channel repetitions a UE may transmit with the transmitter 1115 instead of drop, thereby increasing transmission success rates and enabling network entities to schedule more repetitions.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions for the processor 1140 to cause the device 1105 to perform various aspects of managing overlapping between uplink control channel repetitions and uplink data transmissions as described herein, or the processor 1140 and the memory 1130 may be otherwise configured to perform or support such operations.

Figure 12:
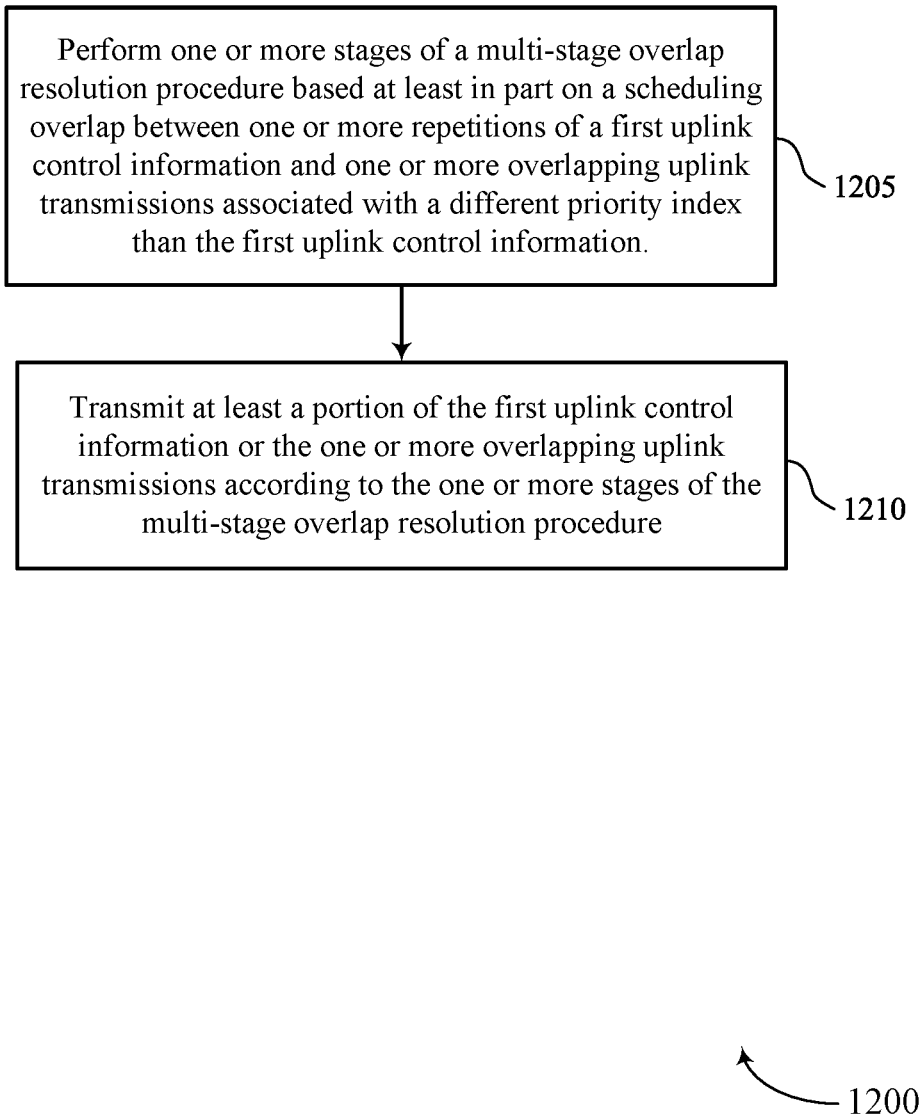
FIGS. 12 through 14 show flowcharts illustrating methods that support managing overlapping between uplink control channel repetitions and uplink data transmissions in accordance with one or more aspects of the present disclosure.

FIG. 12 shows a flowchart illustrating a method 1200 that supports managing overlapping between uplink control channel repetitions and uplink data transmissions in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include performing one or more stages of a multi-stage overlap resolution procedure based at least in part on a scheduling overlap between one or more repetitions of a first UCI and one or more overlapping uplink transmissions associated with a different priority index than the first UCI. The operations of 1205 may be performed in accordance with examples as disclosed herein. In some examples, aspects of the operations of 1205 may be performed by an overlap resolution component 1025 as described with reference to FIG. 10.

At 1210, the method may include transmitting at least a portion of the first UCI or the one or more overlapping uplink transmissions according to the one or more stages of the multi-stage overlap resolution procedure. The operations of 1210 may be performed in accordance with examples as disclosed herein. In some examples, aspects of the operations of 1210 may be performed by a transmission component 1030 as described with reference to FIG. 10.

Figure 13:
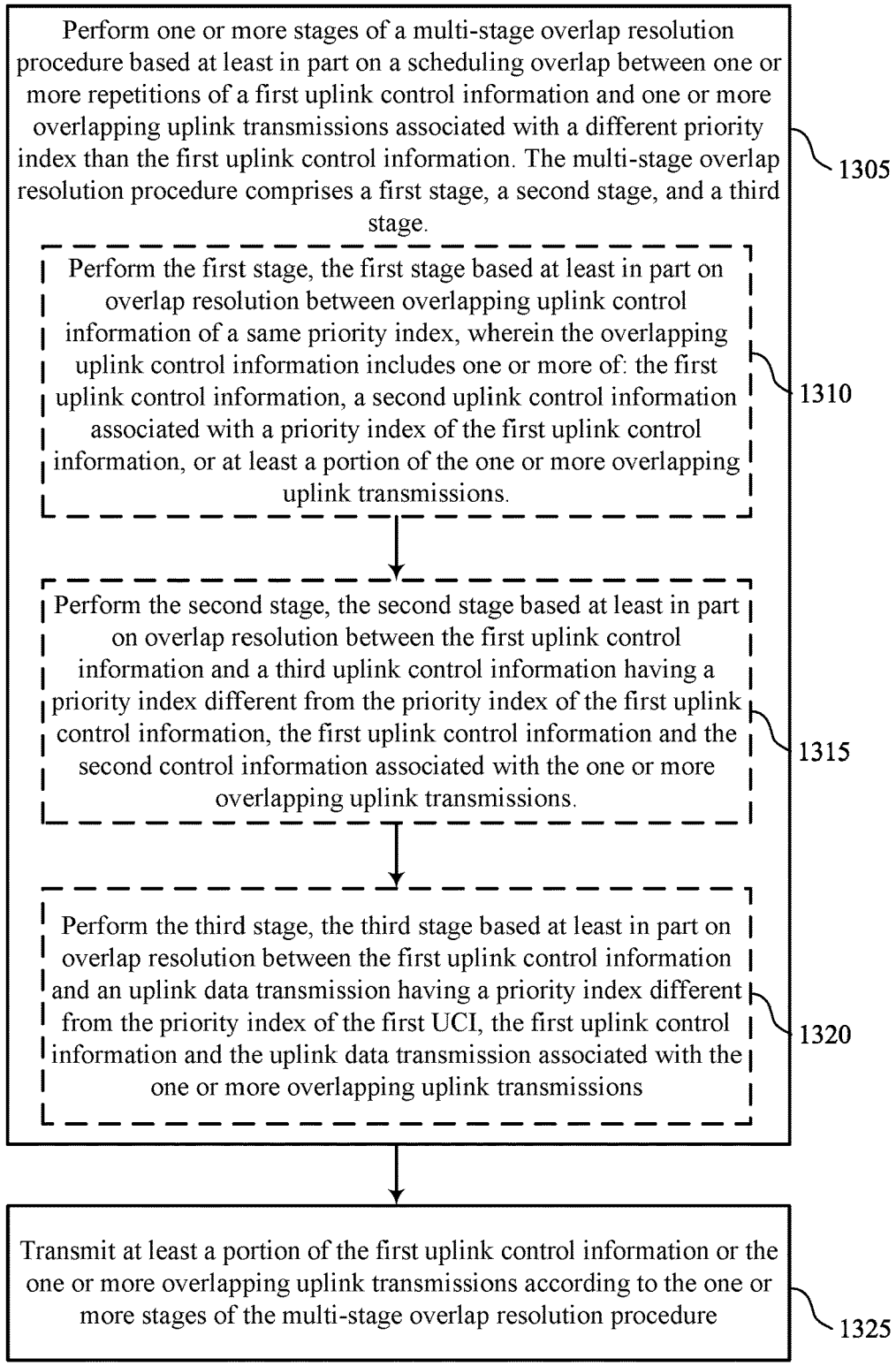

FIG. 13 shows a flowchart illustrating a method 1300 that supports managing overlapping between uplink control channel repetitions and uplink data transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include performing one or more stages of a multi-stage overlap resolution procedure based at least in part on a scheduling overlap between one or more repetitions of a first UCI and one or more overlapping uplink transmissions associated with a different priority index than the first UCI. The one or more stages of the multi-stage overlap resolution procedure may include a first stage, a second stage, and a third stage. The operations of 1305 may be performed in accordance with examples as disclosed herein. In some examples, aspects of the operations of 1305 may be performed by an overlap resolution component 1025 as described with reference to FIG. 10.

At 1310, the method may include performing the first stage of the multi-stage overlap resolution procedure, the first stage based at least in part on a difference between overlapping UCI of a same priority index, where the overlapping UCI includes one or more of: the first UCI, a second UCI associated with a priority index of the first UCI, or at least a portion of the one or more overlapping uplink transmissions. The operations of 1310 may be performed in accordance with examples as disclosed herein. In some examples, aspects of the operations of 1310 may be performed by an overlap resolution component 1025 as described with reference to FIG. 10.

At 1315, the method may include performing the first stage of the multi-stage overlap resolution procedure, the second stage based at least in part on overlap resolution between the first UCI and a third UCI associated with a priority index different from the priority index of the first UCI, the first UCI and the third UCI associated with the one or more overlapping uplink transmissions. The operations of 1315 may be performed in accordance with examples as disclosed herein. In some examples, aspects of the operations of 1315 may be performed by an overlap resolution component 1025 as described with reference to FIG. 10.

At 1320, the method may include performing the third stage of the multi-stage overlap resolution procedure, the third stage based at least in part on overlap resolution between the first UCI and an uplink data transmission associated with a priority index different from the priority index of the first UCI, the first UCI and the uplink data transmission associated with the one or more overlapping uplink transmissions. The operations of 1320 may be performed in accordance with examples as disclosed herein. In some examples, aspects of the operations of 1320 may be performed by an overlap resolution component 1025 as described with reference to FIG. 10.

At 1325, the method may include transmitting at least a portion of the first UCI or the one or more overlapping uplink transmissions according to the one or more stages of the multi-stage overlap resolution procedure. The operations of 1325 may be performed in accordance with examples as disclosed herein. In some examples, aspects of the operations of 1325 may be performed by a transmission component 1030 as described with reference to FIG. 10.

Figure 14:
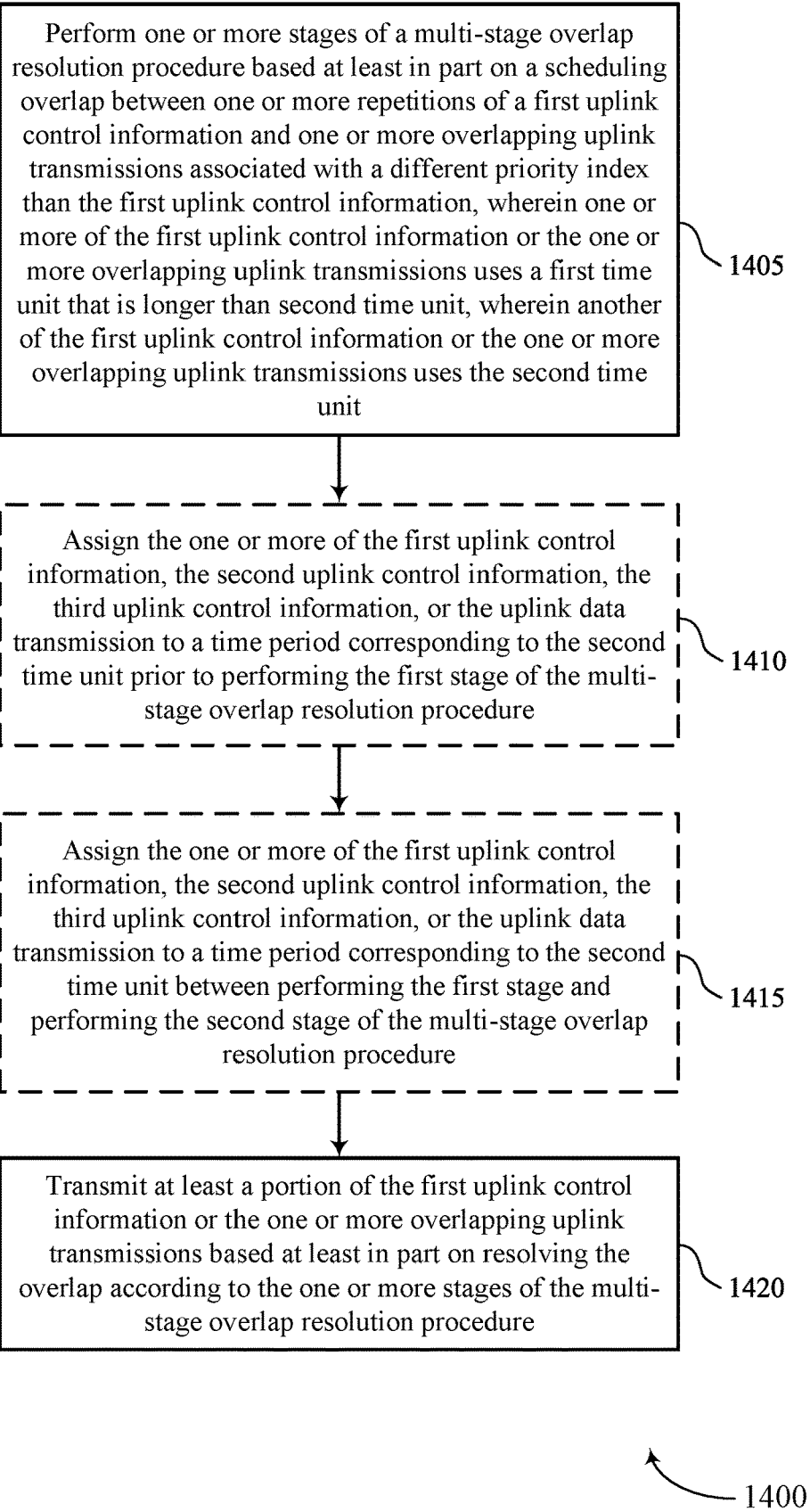

FIG. 14 shows a flowchart illustrating a method 1400 that supports managing overlapping between uplink control channel repetitions and uplink data transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include performing one or more stages of a multi-stage overlap resolution procedure based at least in part on a scheduling overlap between one or more repetitions of a first UCI and one or more overlapping uplink transmissions associated with a different priority index than the first UCI, where one or more of the first UCI, the second UCI, the third UCI, or the uplink data transmission may be scheduled using a first time unit that is longer than second time unit, where another of the first UCI, the second UCI, or the uplink data transmission may be scheduled using the second time unit. The operations of 1405 may be performed in accordance with examples as disclosed herein. In some examples, aspects of the operations of 1405 may be performed by an overlap resolution component 1025 as described with reference to FIG. 10.

At 1410, the method may include assigning the one or more of the first UCI, the second UCI, the third UCI, or the uplink data transmission to a time period corresponding to the second time unit prior to performing the first stage of the multi-stage overlap resolution procedure. The operations of 1410 may be performed in accordance with examples as disclosed herein. In some examples, aspects of the operations of 1410 may be performed by a time unit assignment component 1060 as described with reference to FIG. 10.

At 1415, the method may include assigning the one or more of the first UCI, the second UCI, the third UCI, or the uplink data transmission to a time period corresponding to the second time unit between performing the first stage and performing the second stage of the multi-stage overlap resolution procedure. The operations of 1415 may be performed in accordance with examples as disclosed herein. In some examples, aspects of the operations of 1415 may be performed by a time unit assignment component 1060 as described with reference to FIG. 10.

At 1420, the method may include transmitting at least a portion of the first UCI or the one or more overlapping uplink transmissions according to the one or more stages of the multi-stage overlap resolution procedure. The operations of 1420 may be performed in accordance with examples as disclosed herein. In some examples, aspects of the operations of 1420 may be performed by a transmission component 1030 as described with reference to FIG. 10.

The following provides an overview of aspects of the present disclosure:

Aspect 1: A method of wireless communication at a UE, comprising: performing one or more stages of a multi-stage overlap resolution procedure based at least in part on a scheduling overlap between one or more repetitions of a first UCI and one or more overlapping uplink transmissions associated with a different priority index than the first UCI, the one or more stages of the multi-stage overlap resolution procedure comprising: a first stage based at least in part on a difference between overlapping UCI of a same priority index, wherein the overlapping UCI includes one or more of: the first UCI, a second UCI associated with a priority index of the first UCI, or at least a portion of the one or more overlapping uplink transmissions; a second stage based at least in part on overlap resolution between the first UCI and a third UCI associated with a priority index different from the priority index of the first UCI, the first UCI and the third UCI associated with the one or more overlapping uplink transmissions; and a third stage based at least in part on overlap resolution between the first UCI and an uplink data transmission associated with a priority index different from the priority index of the first UCI, the first UCI and the uplink data transmission associated with the one or more overlapping uplink transmissions; and transmitting at least a portion of the first UCI or the one or more overlapping uplink transmissions according to the one or more stages of the multi-stage overlap resolution procedure.

Aspect 2: The method of aspect 1, wherein performing the one or more stages of the multi-stage overlap resolution procedure comprises: performing the first stage separately for each priority index of a plurality of priority indices.

Aspect 3: The method of any of aspects 1 through 2, wherein performing the one or more stages of the multi-stage overlap resolution procedure further comprises: selectively dropping during the second stage either a repetition of the one or more repetitions of the first UCI or the third UCI, wherein the dropping is based at least in part on the priority index of the first UCI and the priority index of the third UCI.

Aspect 4: The method of any of aspects 1 through 3, wherein performing the one or more stages of the multi-stage overlap resolution procedure further comprises: selectively dropping during the third stage either a repetition of the one or more repetitions of the first UCI or the uplink data transmission, wherein the dropping is based at least in part on the priority index of the first UCI and the priority index of the uplink data transmission.

Aspect 5: The method of any of aspects 1 through 4, wherein transmitting at least the portion of the first UCI comprises: selectively dropping a repetition of the one or more repetitions of the first UCI and transmitting a remaining portion of the one or more repetitions of the first UCI.

Aspect 6: The method of any of aspects 1 through 5, further comprising: receiving an uplink grant for the uplink data transmission within a first processing time defined for the UE; and receiving a downlink transmission triggering one or more of: the first UCI, the second UCI, or the third UCI within a second processing time defined for the UE.

Aspect 7: The method of any of aspects 1 through 6, wherein one or both of the second UCI or the third UCI has no repetitions.

Aspect 8: The method of any of aspects 1 through 7, wherein performing the one or more stages of the multi-stage overlap resolution procedure further comprises: dropping a plurality of repetitions of the one or more repetitions of the first UCI during the second stage when the third UCI is scheduled to overlap with the plurality of repetitions of the one or more repetitions of the first UCI and the priority index of the first UCI indicates a lower priority than the priority index of the third UCI.

Aspect 9: The method of any of aspects 1 through 8, wherein performing the one or more stages of the multi-stage overlap resolution procedure further comprises: dropping the third UCI during the second stage when the third UCI is scheduled to overlap with a plurality of repetitions of the one or more repetitions of the first UCI and the priority index of the first UCI indicates a higher priority than the priority index of the second UCI.

Aspect 10: The method of any of aspects 1 through 9, wherein performing the one or more stages of the multi-stage overlap resolution procedure further comprises: dropping a plurality of repetitions of the one or more repetitions of the first UCI during the third stage when the uplink data transmission is scheduled to overlap with the plurality of repetitions of the one or more repetitions of the first UCI and the priority index of the first UCI indicates a lower priority than the priority index of the uplink data transmission.

Aspect 11: The method of any of aspects 1 through 10, wherein performing the one or more stages of the multi-stage overlap resolution procedure further comprises: dropping the uplink data transmission during the third stage when the uplink data transmission is scheduled to overlap with a plurality of repetitions of the one or more repetitions of the first UCI and the priority index of the first UCI indicates a higher priority than the priority index of the uplink data transmission.

Aspect 12: The method of any of aspects 1 through 11, wherein one or more of the first UCI, the second UCI, the third UCI, or the uplink data transmission is scheduled using a first time unit that is longer than second time unit, wherein another of the first UCI, the second UCI, or the uplink data transmission is scheduled using the second time unit.

Aspect 13: The method of aspect 12, further comprising: assigning the one or more of the first UCI, the second UCI, the third UCI, or the uplink data transmission to a time period corresponding to the second time unit prior to performing the first stage of the multi-stage overlap resolution procedure.

Aspect 14: The method of any of aspects 12 through 13, further comprising: assigning the one or more of the first UCI, the second UCI, the third UCI, or the uplink data transmission to a time period corresponding to the second time unit between performing the first stage and performing the second stage of the multi-stage overlap resolution procedure.

Aspect 15: The method of any of aspects 1 through 14, wherein the first stage is based at least in part on a difference in starting slot index or UCI type between the overlapping UCI of the same priority index.

Aspect 16: An apparatus comprising at least one processor; and memory coupled with the at least one processor, the memory storing instructions for the at least one processor to cause a UE to perform a method of any of aspects 1 through 15.

Aspect 17: An apparatus comprising at least one means for performing a method of any of aspects 1 through 15.

Aspect 18: A non-transitory computer-readable medium storing code the code comprising instructions for at least one processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   memory coupled with the at least one processor, the memory storing instructions for the at least one processor to cause the UE to:
   perform a multi-stage overlap resolution procedure based at least in part on a scheduling overlap between one or more repetitions of a first uplink control information and one or more overlapping uplink transmissions associated with a different priority index than the first uplink control information, the multi-stage overlap resolution procedure comprising:
      a first stage based at least in part on overlap resolution between overlapping uplink control information of a same priority index, wherein the overlapping uplink control information includes one or more of: the one or more repetitions of the first uplink control information, a second uplink control information associated with a priority index of the first uplink control information, or at least a portion of the one or more overlapping uplink transmissions;
      a second stage based at least in part on overlap resolution between the one or more repetitions of the first uplink control information and a third uplink control information associated with a priority index different from the priority index of the first uplink control information, the one or more repetitions of the first uplink control information and the third uplink control information associated with the one or more overlapping uplink transmissions; and
      a third stage based at least in part on overlap resolution between the one or more repetitions of the first uplink control information and an uplink data transmission associated with a priority index different from the priority index of the first uplink control information, the one or more repetitions of the first uplink control information and the uplink data transmission associated with the one or more overlapping uplink transmissions; and
   transmit at least a portion of the first uplink control information or the one or more overlapping uplink transmissions according to the multi-stage overlap resolution procedure including at least the first stage, the second stage, and the third stage.

2. The apparatus of claim 1, wherein the instructions to perform the multi-stage overlap resolution procedure are further for the at least one processor to cause the UE to:
   perform the first stage separately for each priority index of a plurality of priority indices.

3. The apparatus of claim 1, wherein the instructions to perform the multi-stage overlap resolution procedure are further for the at least one processor to cause the UE to:
   selectively drop during the second stage either a repetition of the one or more repetitions of the first uplink control information or the third uplink control information, wherein the dropping is based at least in part on the priority index of the first uplink control information and the priority index of the third uplink control information.

4. The apparatus of claim 1, wherein the instructions to perform the multi-stage overlap resolution procedure are further for the at least one processor to cause the UE to:
   selectively drop during the third stage either a repetition of the one or more repetitions of the first uplink control information or the uplink data transmission, wherein the dropping is based at least in part on the priority index of the first uplink control information and the priority index of the uplink data transmission.

5. The apparatus of claim 1, wherein the instructions to transmit at least the portion of the first uplink control information are for the at least one processor to cause the UE to:
selectively drop a repetition of the one or more repetitions of the first uplink control information and transmitting a remaining portion of the one or more repetitions of the first uplink control information.

6. The apparatus of claim 1, wherein the instructions are further for the at least one processor to cause the UE to:
receive an uplink grant for the uplink data transmission within a first processing time defined for the UE; and
receive a downlink transmission triggering one or more of: the first uplink control information, the second uplink control information, or the third uplink control information within a second processing time defined for the UE.

7. The apparatus of claim 1, wherein one or both of the second uplink control information or the third uplink control information has no repetitions.

8. The apparatus of claim 1, wherein the instructions to perform the multi-stage overlap resolution procedure are further for the at least one processor to cause the UE to:
drop a plurality of repetitions of the one or more repetitions of the first uplink control information during the second stage when the third uplink control information is scheduled to overlap with the plurality of repetitions of the one or more repetitions of the first uplink control information and the priority index of the first uplink control information indicates a lower priority than the priority index of the third uplink control information.

9. The apparatus of claim 1, wherein the instructions to perform the multi-stage overlap resolution procedure are further for the at least one processor to cause the UE to:
drop the third uplink control information during the second stage when the third uplink control information is scheduled to overlap with a plurality of repetitions of the one or more repetitions of the first uplink control information and the priority index of the first uplink control information indicates a higher priority than the priority index of the second uplink control information.

10. The apparatus of claim 1, wherein the instructions to perform the multi-stage overlap resolution procedure are further for the at least one processor to cause the UE to:
drop a plurality of repetitions of the one or more repetitions of the first uplink control information during the third stage when the uplink data transmission is scheduled to overlap with the plurality of repetitions of the one or more repetitions of the first uplink control information and the priority index of the first uplink control information indicates a lower priority than the priority index of the uplink data transmission.

11. The apparatus of claim 1, wherein the instructions to perform the multi-stage overlap resolution procedure are further for the at least one processor to cause the UE to:
drop the uplink data transmission during the third stage when the uplink data transmission is scheduled to overlap with a plurality of repetitions of the one or more repetitions of the first uplink control information and the priority index of the first uplink control information indicates a higher priority than the priority index of the uplink data transmission.

12. The apparatus of claim 1, wherein one or more of the first uplink control information, the second uplink control information, the third uplink control information, or the uplink data transmission is scheduled using a first time unit that is longer than a second time unit, wherein another of the first uplink control information, the second uplink control information, or the uplink data transmission is scheduled using the second time unit.

13. The apparatus of claim 12, wherein the instructions are further for the at least one processor to cause the UE to:
assign the one or more of the first uplink control information, the second uplink control information, the third uplink control information, or the uplink data transmission to a time period corresponding to the second time unit prior to performing the first stage of the multi-stage overlap resolution procedure.

14. The apparatus of claim 12, wherein the instructions are further for the at least one processor to cause the UE to:
assign the one or more of the first uplink control information, the second uplink control information, the third uplink control information, or the uplink data transmission to a time period corresponding to the second time unit between performing the first stage and performing the second stage of the multi-stage overlap resolution procedure.

15. The apparatus of claim 1, wherein the first stage is based at least in part on a difference in starting slot index or uplink control information type between the overlapping uplink control information of the same priority index.

16. A method of wireless communication at a user equipment (UE), comprising:
performing a multi-stage overlap resolution procedure based at least in part on a scheduling overlap between one or more repetitions of a first uplink control information and one or more overlapping uplink transmissions associated with a different priority index than the first uplink control information, the multi-stage overlap resolution procedure comprising:
a first stage based at least in part on overlap resolution between overlapping uplink control information of a same priority index, wherein the overlapping uplink control information includes one or more of: the one or more repetitions of the first uplink control information, a second uplink control information associated with a priority index of the first uplink control information, or at least a portion of the one or more overlapping uplink transmissions;
a second stage based at least in part on overlap resolution between the one or more repetitions of the first uplink control information and a third uplink control information associated with a priority index different from the priority index of the first uplink control information, the one or more repetitions of the first uplink control information and the third uplink control information associated with the one or more overlapping uplink transmissions; and
a third stage based at least in part on overlap resolution between the one or more repetitions of the first uplink control information and an uplink data transmission associated with a priority index different from the priority index of the first uplink control information, the one or more repetitions of the first uplink control information and the uplink data transmission associated with the one or more overlapping uplink transmissions; and
transmitting at least a portion of the first uplink control information or the one or more overlapping uplink transmissions according to the multi-stage overlap resolution procedure including at least the first stage, the second stage, and the third stage.

17. The method of claim 16, wherein performing the multi-stage overlap resolution procedure further comprises:

performing the first stage separately for each priority index of a plurality of priority indices.

18. The method of claim 16, wherein performing the multi-stage overlap resolution procedure further comprises:
selectively dropping during the second stage either a repetition of the one or more repetitions of the first uplink control information or the third uplink control information, wherein the dropping is based at least in part on the priority index of the first uplink control information and the priority index of the third uplink control information.

19. The method of claim 16, wherein performing the multi-stage overlap resolution procedure further comprises:
selectively dropping during the third stage either a repetition of the one or more repetitions of the first uplink control information or the uplink data transmission, wherein the dropping is based at least in part on the priority index of the first uplink control information and the priority index of the uplink data transmission.

20. The method of claim 16, wherein transmitting at least the portion of the first uplink control information comprises:
selectively dropping a repetition of the one or more repetitions of the first uplink control information and transmitting a remaining portion of the one or more repetitions of the first uplink control information.

21. The method of claim 16, further comprising:
receiving an uplink grant for the uplink data transmission within a first processing time defined for the UE; and
receiving a downlink transmission triggering one or more of: the first uplink control information, the second uplink control information, or the third uplink control information within a second processing time defined for the UE.

22. The method of claim 16, wherein one or both of the second uplink control information or the third uplink control information has no repetitions.

23. The method of claim 16, wherein performing the multi-stage overlap resolution procedure further comprises:
dropping a plurality of repetitions of the one or more repetitions of the first uplink control information during the second stage when the third uplink control information is scheduled to overlap with the plurality of repetitions of the one or more repetitions of the first uplink control information and the priority index of the first uplink control information indicates a lower priority than the priority index of the third uplink control information.

24. The method of claim 16, wherein performing the multi-stage overlap resolution procedure further comprises:
dropping the third uplink control information during the second stage when the third uplink control information is scheduled to overlap with a plurality of repetitions of the one or more repetitions of the first uplink control information and the priority index of the first uplink control information indicates a higher priority than the priority index of the second uplink control information.

25. The method of claim 16, wherein performing the multi-stage overlap resolution procedure further comprises:
dropping a plurality of repetitions of the one or more repetitions of the first uplink control information during the third stage when the uplink data transmission is scheduled to overlap with the plurality of repetitions of the one or more repetitions of the first uplink control information and the priority index of the first uplink control information indicates a lower priority than the priority index of the uplink data transmission.

26. The method of claim 16, wherein performing the multi-stage overlap resolution procedure further comprises:
dropping the uplink data transmission during the third stage when the uplink data transmission is scheduled to overlap with a plurality of repetitions of the one or more repetitions of the first uplink control information and the priority index of the first uplink control information indicates a higher priority than the priority index of the uplink data transmission.

27. The method of claim 16, wherein one or more of the first uplink control information, the second uplink control information, the third uplink control information, or the uplink data transmission is scheduled using a first time unit that is longer than a second time unit, wherein another of the first uplink control information, the second uplink control information, or the uplink data transmission is scheduled using the second time unit.

28. The method of claim 27, further comprising:
assigning the one or more of the first uplink control information, the second uplink control information, the third uplink control information, or the uplink data transmission to a time period corresponding to the second time unit prior to performing the first stage of the multi-stage overlap resolution procedure.

29. A non-transitory computer-readable medium storing code for wireless communication, the code comprising instructions for at least one processor to:
perform a multi-stage overlap resolution procedure based at least in part on a scheduling overlap between one or more repetitions of a first uplink control information and one or more overlapping uplink transmissions associated with a different priority index than the first uplink control information, the multi-stage overlap resolution procedure comprising:
a first stage based at least in part on overlap resolution between overlapping uplink control information of a same priority index, wherein the overlapping uplink control information includes one or more of: the one or more repetitions of the first uplink control information, a second uplink control information associated with a priority index of the first uplink control information, or at least a portion of the one or more overlapping uplink transmissions;
a second stage based at least in part on overlap resolution between the one or more repetitions of the first uplink control information and a third uplink control information associated with a priority index different from the priority index of the first uplink control information, the one or more repetitions of the first uplink control information and the third uplink control information associated with the one or more overlapping uplink transmissions; and
a third stage based at least in part on overlap resolution between the one or more repetitions of the first uplink control information and an uplink data transmission associated with a priority index different from the priority index of the first uplink control information, the one or more repetitions of the first uplink control information and the uplink data transmission associated with the one or more overlapping uplink transmissions; and
transmit at least a portion of the first uplink control information or the one or more overlapping uplink transmissions according to the multi-stage overlap resolution procedure including at least the first stage, the second stage, and the third stage.

30. An apparatus, comprising:

means for performing a multi-stage overlap resolution procedure based at least in part on a scheduling overlap between one or more repetitions of a first uplink control information and one or more overlapping uplink transmissions associated with a different priority index than the first uplink control information, the multi-stage overlap resolution procedure comprising:
- a first stage based at least in part on overlap resolution between overlapping uplink control information of a same priority index, wherein the overlapping uplink control information includes one or more of: the one or more repetitions of the first uplink control information, a second uplink control information associated with a priority index of the first uplink control information, or at least a portion of the one or more overlapping uplink transmissions;
- a second stage based at least in part on overlap resolution between the one or more repetitions of the first uplink control information and a third uplink control information associated with a priority index different from the priority index of the first uplink control information, the one or more repetitions of the first uplink control information and the third uplink control information associated with the one or more overlapping uplink transmissions; and
- a third stage based at least in part on overlap resolution between the one or more repetitions of the first uplink control information and an uplink data transmission associated with a priority index different from the priority index of the first uplink control information, the one or more repetitions of the first uplink control information and the uplink data transmission associated with the one or more overlapping uplink transmissions; and means for transmitting at least a portion of the first uplink control information or the one or more overlapping uplink transmissions according to the multi-stage overlap resolution procedure including at least the first stage, the second stage, and the third stage.

* * * * *